US008655560B2

(12) United States Patent
Matsubara et al.

(10) Patent No.: US 8,655,560 B2
(45) Date of Patent: Feb. 18, 2014

(54) CONTROL APPARATUS AND CONTROL METHOD FOR VEHICULAR DRIVE APPARATUS

(75) Inventors: Tooru Matsubara, Toyota (JP); Atsushi Tabata, Okazaki (JP); Masakazu Kaifuku, Okazaki (JP); Hidenori Katoh, Nishio (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1179 days.

(21) Appl. No.: 11/987,505

(22) Filed: Nov. 30, 2007

(65) Prior Publication Data

US 2008/0215214 A1  Sep. 4, 2008

(30) Foreign Application Priority Data

Dec. 4, 2006  (JP) .................................. 2006-327008

(51) Int. Cl.
*F16H 61/14*  (2006.01)
(52) U.S. Cl.
USPC ................... 701/51; 701/55; 701/58; 701/67; 701/68; 477/34; 477/62; 477/70; 477/79; 477/77; 477/166; 477/174
(58) Field of Classification Search
USPC ........... 701/50–55, 84, 56, 60, 58, 67, 68, 74, 701/90; 477/34, 62, 70, 79, 77, 166, 168, 477/169, 174, 176; 192/3.3, 3.31, 3.33
See application file for complete search history.

(56) References Cited

U.S. PATENT DOCUMENTS

| | | | | |
|---|---|---|---|---|
| 6,652,415 | B2* | 11/2003 | Segawa et al. .................. | 477/62 |
| 2006/0183581 | A1* | 8/2006 | Iwatsuki et al. .................. | 474/8 |

FOREIGN PATENT DOCUMENTS

| | | | |
|---|---|---|---|
| JP | A-5-332429 | | 12/1993 |
| JP | A-8-105534 | | 4/1996 |
| JP | A-8-127261 | | 5/1996 |
| JP | A-8-303578 | | 11/1996 |
| JP | A-9-4707 | | 1/1997 |
| JP | A 10-196779 | | 7/1998 |
| JP | A-11-108171 | | 4/1999 |
| JP | 2001108090 A | * | 4/2001 |
| JP | A 2001-108090 | | 4/2001 |
| JP | 2002283880 A | * | 10/2002 |
| JP | A 2002-283880 | | 10/2002 |

(Continued)

OTHER PUBLICATIONS

Jan. 10, 2012 Office Action issued in Japanese Application No. 2006-327008 (with English Translation).

*Primary Examiner* — Thomas Tarcza
*Assistant Examiner* — Adam Tissot
(74) *Attorney, Agent, or Firm* — Oliff PLC

(57) ABSTRACT

A control apparatus and a control method for a vehicular drive apparatus that includes a driving power source, and a power transmission device that transmits power from the driving power source to a drive wheel are provided. It is determined that a malfunction occurs in the power transmission device, when a comparison value remains equal to or above a predetermined value for a predetermined period. The comparison value is obtained by making a comparison between an actual value and a theoretical value that relate to a rotational speed of a predetermined rotational member that constitutes at least a part of the vehicular drive apparatus. The predetermined period is set according to an operating state of the power transmission device. Thus, it is possible to reduce the possibility that it is erroneously determined that a malfunction occurs, and to quickly determine that a malfunction occurs.

22 Claims, 11 Drawing Sheets

(56) References Cited

FOREIGN PATENT DOCUMENTS

| JP | A-2003-127681 | 5/2003 |
| JP | A-2005-291435 | 10/2005 |
| JP | A 2006-220225 | 8/2006 |

* cited by examiner

FIG.2

|     | C1 | C2 | B1 | B2 | B3 | SPEED RATIO | STEP |
|-----|----|----|----|----|----|-------------|------|
| 1st | O  |    |    |    | O  | 3.357       |      |
|     |    |    |    |    |    |             | 1.54 |
| 2nd | O  |    |    | O  |    | 2.180       |      |
|     |    |    |    |    |    |             | 1.53 |
| 3rd | O  |    | O  |    |    | 1.424       |      |
|     |    |    |    |    |    |             | 1.42 |
| 4th | O  | O  |    |    |    | 1.000       |      |
| R   |    | O  |    |    | O  | 3.209       | TOTAL 3.36 |
| N   |    |    |    |    |    |             |      |

O CIRCLE: ENGAGED

CONTROL APPARATUS AND CONTROL METHOD FOR VEHICULAR DRIVE APPARATUS

INCORPORATION BY REFERENCE

The disclosure of Japanese Patent Application No. 2006-327008 filed on Dec. 4, 2006, including the specification, drawings and abstract is incorporated herein by reference in its entirety.

BACKGROUND OF THE INVENTION

1. Field of the Invention

The invention relates to a control apparatus and a control method for a vehicular drive apparatus that includes a driving power source, and a power transmission device that transmits power from the driving power source to a drive wheel. More specifically, the invention relates to a technology for determining whether a malfunction occurs in a power transmission device.

2. Description of the Related Art

A control apparatus for a vehicular drive apparatus is available. The control apparatus determines whether a malfunction occurs in a power transmission device provided in the vehicular drive apparatus by making a comparison between the actual rotational speed and the theoretical rotational speed of a predetermined rotational member that constitutes a part of the vehicular drive apparatus. For example, Japanese Patent Application Publication No. 2001-108090 (JP-A-2001-108090) describes a technology in which it is determined whether a malfunction occurs in a shift device by calculating a theoretical value of an output rotational speed of the shift device based on an input rotational speed of the shift device and a speed ratio, and comparing an actual output rotational speed detected by a rotational speed sensor with the calculated theoretical value. Also, Japanese Patent Application Publication No. 2006-220225 (JP-A-2006-220225), Japanese Patent Application Publication No. 10-196779 (JP-A-10-196779), and Japanese Patent Application Publication No. 2002-283880 (JP-A-2002-283880) describe technologies related to the invention.

In the case where it is determined whether a malfunction occurs in the above-described power transmission device, it may be determined that a malfunction occurs in the power transmission device, when it is determined that the power transmission device remains in an abnormal state for a predetermined period. This improves determination accuracy.

However, in the case where the rotational speed sensor detects the actual rotational speed of the rotational member, when the actual rotational speed is in the low rotational speed region, the accuracy of detecting the rotational speed is generally low, and the timing at which the rotational speed is detected is generally delayed, due to the characteristic of the rotational speed sensor, as compared to when the actual rotational speed is in the high rotational speed region. Therefore, for example, if the above-described predetermined period is set to a constant period, it may be erroneously determined that a malfunction occurs although no malfunction occurs when the rotational speed is in the low rotational speed region, or the accuracy of determining that a malfunction occurs may deteriorate when the rotational speed is in the high rotational speed region.

In the case where a predetermined control is started, for example, a fail-safe control that prevents the rotational member from overspeeding is started to improve the endurance of the power transmission device when it is determined that a malfunction occurs in the power transmission device, it is desired to avoid as much as possible the situation where it is erroneously determined that a malfunction occurs and the fail-safe control is executed due to the erroneous determination when the rotational speed is in the low rotational speed region, and it is desired to quickly start the fail-safe control, when the rotational speed is in the high rotational speed region, because a difference between the rotational speed and an overspeed value is small when the rotational speed is in the high rotational speed region.

For example, a power transmission device that includes a differential portion and a shift portion is available. The differential portion includes a first rotational element (first element) connected to an engine, a second rotational element (second element) connected to a first motor, and a third rotational element (third element) connected to a transmitting member and a second motor. The differential portion distributes output from the engine to the first motor and the transmitting member. The shift portion is provided in a power transmission path from the transmitting member to a drive wheel. In the case where the power transmission device with this configuration is used, if there is no load in an area downstream of the transmitting member (i.e., an area which is closer to the drive wheel than the transmitting member is) due to a malfunction relating to the shift portion, the transmitting member and/or the second motor may overspeed. The problem that the transmitting member and/or the second motor may overspeed has not been sufficiently examined. In this regard, when a malfunction relating to the shift portion occurs, the fail-safe control, which prevents the transmitting member and/or the second motor from overspeeding, may be executed. Therefore, it is desired to improve the accuracy of determining that a malfunction occurs when the rotational speed is in the high rotational speed region, and to reduce the possibility that it is erroneously and unnecessarily determined that a malfunction occurs.

The power transmission device that includes the differential portion and the shift portion is an example of the power transmission device. The problem is not limited to a determination as to whether a malfunction occurs in the above-described power transmission device. Another example of the power transmission device may be an engagement device that switches the state of the power transmission path through which power from the driving power source is transmitted to the drive wheel, between a power-transmission permitted state and a power-transmission interrupted state. Naturally, the problem occurs when it is determined whether a malfunction occurs in the above-described engagement device.

SUMMARY OF THE INVENTION

The invention provides a control apparatus and a control method for a vehicular drive apparatus, which determines that a malfunction occurs in a power transmission device at an appropriate timing.

An aspect of the invention relates to a control apparatus for a vehicular drive apparatus that includes a driving power source, and a power transmission device that transmits power from the driving power source to a drive wheel. The control apparatus includes a malfunction determination device that determines that a malfunction occurs in the power transmission device, when a comparison value remains equal to or above a predetermined value for a predetermined period. The comparison value is obtained by malting a comparison between an actual value and a theoretical value that relate to a rotational speed of a predetermined rotational member that constitutes at least a part of the vehicular drive apparatus. The malfunction determination device sets the predetermined period according to an operating state of the power transmission device.

Another aspect of the invention relates to a control method for a vehicular drive apparatus that includes a driving power source, and a power transmission device that transmits power from the driving power source to a drive wheel. The control method includes determining that a malfunction occurs in the power transmission device, when a comparison value remains equal to or above a predetermined value for a predetermined period, wherein the comparison value is obtained by making a comparison between an actual value and a theoretical value that relate to a rotational speed of a predetermined rotational member that constitutes at least a part of the vehicular drive apparatus. The predetermined period is set according to an operating state of the power transmission device.

In the control apparatus and the control method for the vehicular drive apparatus, it is determined that a malfunction occurs in the power transmission device, when the comparison value remains equal to or above the predetermined value for the predetermined period. The comparison value is obtained by making the comparison between the actual value and the theoretical value that relate to the rotational speed of the predetermined rotational member that constitutes at least a part of the vehicular drive apparatus. ID addition, the predetermined period is set according to the operating state of the power transmission device. Therefore, it is possible to determine that a malfunction occurs in the power transmission device at an appropriate timing. For example, when the actual rotational speed of the predetermined rotational member is in a low rotational speed region, and accordingly, it is likely to be erroneously determined that a malfunction occurs, the predetermined period is set to a relatively long period. When the actual rotational speed of the predetermined rotational member is in a high rotational speed region, and accordingly, a difference between the actual rotational speed and an overspeed value is small, the predetermined period is set to a relatively short period. Thus, it is possible to determine that a malfunction occurs in the power transmission device at an appropriate timing. Also, for example, when the comparison value is small, and accordingly, the degree of abnormality is low, the predetermined period is set to a relatively long period. When the comparison value is large, and accordingly, the degree of abnormality is high, the predetermined period is set to a relatively short period. Thus, it is possible to determine that a malfunction occurs in the power transmission device at an appropriate timing.

The differential mechanism may be a planetary gear unit that has a first element connected to the engine, a second element connected to the first motor, and a third element connected to the transmitting member. The first element may be a carrier of the planetary gear unit. The second element may be a sun gear of the planetary gear unit. The third element may be a ring gear of the planetary gear unit. With the configuration, the size of the differential mechanism in the axial direction is reduced. Also, the differential mechanism is easily configured using one planetary gear unit.

Also, the planetary gear unit may be a single pinion planetary gear unit. With the configuration, the size of the differential mechanism in the axial direction is reduced. Also, the differential portion is easily configured using one single pinion planetary gear unit.

Also, the total speed ratio of the vehicular drive apparatus may be determined based on the speed ratio (gear ratio) of the shift portion and the speed ratio of the differential portion. With the configuration, it is possible to obtain a wide range of driving power, using the speed ratio of the shift portion.

Also, the shift portion may be a stepped automatic transmission. With the configuration, for example, a continuously variable transmission may be formed by combining the differential portion, which functions as an electric continuously variable transmission, with the stepped automatic transmission. In this case, it is possible to smoothly change the drive torque. When the speed ratio of the differential portion is controlled to be constant, a stepped transmission is substantially formed by combining the differential portion with the stepped automatic transmission. In this case, the total speed ratio of the vehicular drive apparatus is changed in a stepwise manner, and the drive torque is quickly obtained.

The value relating to the output rotational speed may be a value that corresponds one-tone with the output rotational speed of at least a part of the power transmission device (for example, the shift portion). In addition to the output rotational speed of at least a part of the power transmission device, for example, the rotational speed of an axle, the rotational speed of a propeller shaft, the output rotational speed of a differential gear unit, a vehicle speed (i.e., the speed of the vehicle) may be used as the value relating to the output rotational speed.

BRIEF DESCRIPTION OF THE DRAWINGS

The features, advantages thereof, and technical and industrial significance of this invention will be better understood by reading the following detailed description of embodiments of the invention, when considered in connection with the accompanying drawings, in which:

FIG. 2 is an operation table explaining the combinations of operations of hydraulic frictional engagement devices used in the shift operation of the drive apparatus in FIG. 1;

DETAILED DESCRIPTION OF EMBODIMENTS

In the following description and the accompanying drawings, the invention will be described in more detail with reference to embodiments.

Figure 1:
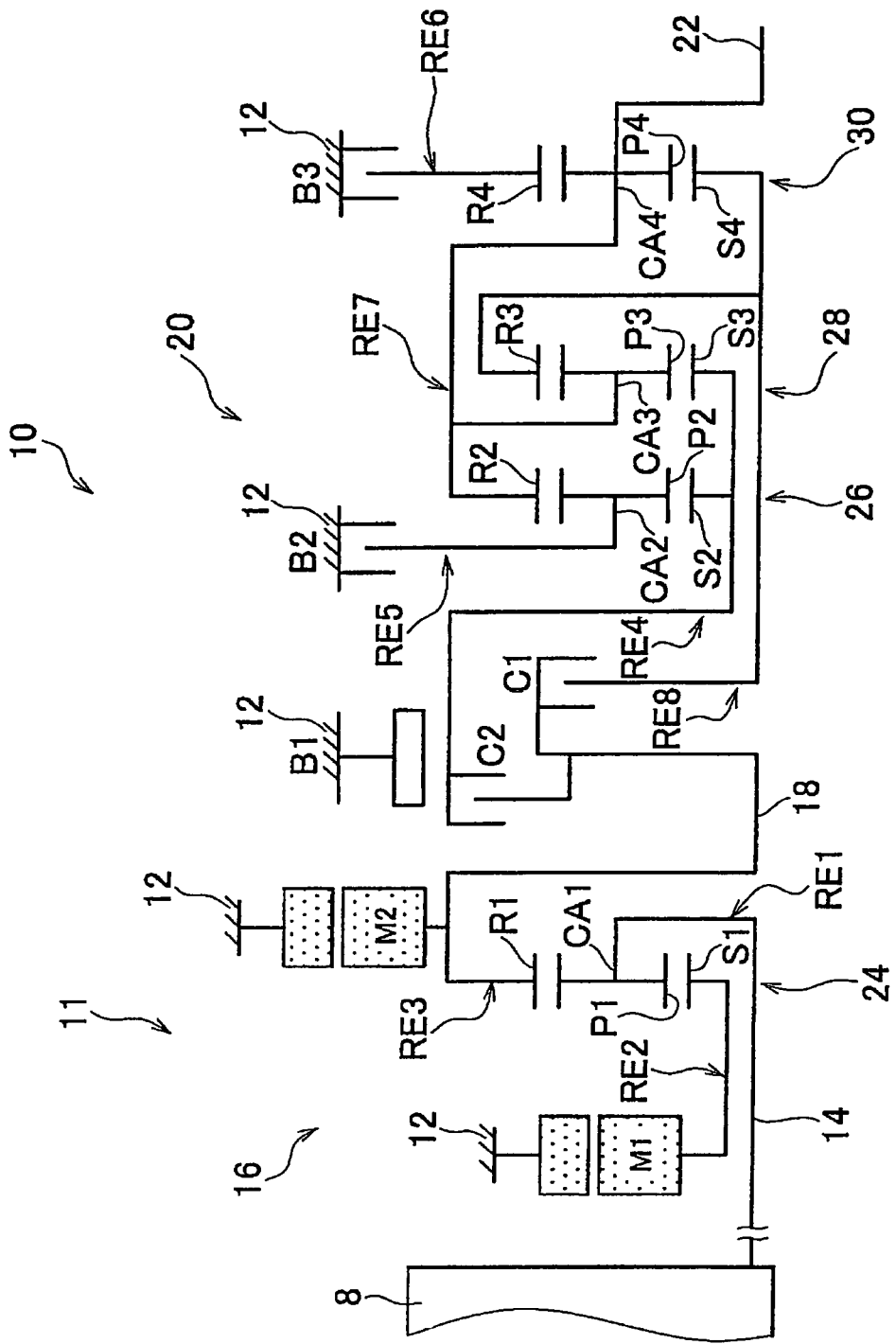
FIG. 1 is a schematic diagram explaining the configuration of a drive apparatus for a hybrid vehicle, according to an embodiment of the invention.

A control apparatus for a vehicular drive apparatus according to an embodiment will be described. FIG. 1 is a schematic diagram explaining a shift mechanism 10 that constitutes a part of a drive apparatus for a hybrid vehicle to which the invention is applied. In FIG. 1, the shift mechanism 10 includes an input shaft 14, a differential portion 11, an automatic shift portion 20, and an output shaft 22 that are provided in series on a common axis in a transmission case (hereinafter, simply referred to as "case") 12. The transmission case 12, which is a non-rotational member, is fitted to a vehicle body. The input shaft 14 is an input rotational member. The differential portion 11, which is a CVT portion, is directly connected to the input shaft 14, or indirectly connected to the input shaft 14 via a pulsation absorption damper (i.e., a vibration-damping device; not shown) or the like. The automatic shift portion 20 is a power transmission portion. The automatic shift portion 20 is provided in a power transmission path between the differential portion 11 and drive wheels 34 (refer to FIG. 7), and directly connected to the differential portion 11 via a transmitting member (transmitting shaft) 18. The output shaft 22, which is an output rotational member, is connected to the automatic shift portion 20. For example, the shift mechanism 10 is provided in a front-engine rear-wheel-drive vehicle where an engine is longitudinally disposed. The shift mechanism 10 is provided in the power transmission path between an internal combustion engine (hereinafter, simply referred to as "engine") 8 such as a gasoline engine or a diesel engine, and a pair of drive wheels 34. The engine 8 is a driving power source for driving the vehicle, which is directly connected to the input shaft 14, or indirectly connected to the input shaft 14 via the pulsation absorption damper (not shown). The shift mechanism 10 transmits power from the engine 8 to the pair of drive wheels 34 via a differential gear unit (final reducer) 32 (refer to FIG. 7), a pair of axles, and the like, which constitute a part of the power transmission path.

Thus, the engine 8 is directly connected to the differential portion 11 in the shift mechanism 10 in the embodiment. That is, the engine 8 is connected to the differential portion 11 without providing a fluid transmission device such as a torque converter or a fluid coupling between the engine 8 and the differential portion 11. For example, when the engine 8 is connected to the differential portion 11 via the above-described pulsation absorption damper, it is regarded that the engine 8 is directly connected to the differential portion 11. Because the configuration of the shift mechanism 10 is symmetric with respect to the axis thereof, the lower portion of the shift mechanism 10 is omitted in the schematic diagram in FIG. 1.

The differential portion 11 includes a first motor M1, a power split mechanism 16, and a second motor M2. The power split mechanism 16 is a mechanical mechanism that mechanically distributes the output from the engine 8, which is input to the input shaft 14. That is, the power split mechanism 16 is a differential mechanism that distributes the output from the engine 8 to the first motor M1 and the transmitting member 18. The second motor M2 is operatively connected to the transmitting member 18 so that the second motor M2 is rotated integrally with the transmitting member 18. Each of the first motor M1 and the second motor M2 in the embodiment is a so-called motor-generator that has the function of generating electric power (power-generation function). The first motor M1 has at least the power-generation function for bearing a reaction force. The second motor M2 has at least a motor function for outputting the driving power as the driving power source.

The power split mechanism 16 mainly includes a first planetary gear unit 24. The first planetary gear unit 24 is of a single pinion type, and has a predetermined gear ratio ρ1 of, for example, approximately "0.418". The first planetary gear unit 24 includes a first sun gear S1, a first planetary gear P1, a first carrier CA1, and a first ring gear R1, which are rotational elements (elements). The first carrier CA1 supports the first planetary gear P1 so that the first planetary gear P1 rotates on its axis, and moves around the first sun gear S1. The first ring gear R1 engages with the first sun gear S1 via the first planetary gear P1. The gear ratio ρ1 is equal to ZS1/ZR1. In this equation, ZS1 represents the number of teeth of the first sun gear S1, and ZR1 represents the number of teeth of the first ring gear R1.

In the power split mechanism 16, the first carrier CA1 is connected to the input shaft 14, that is, the engine 8. The first sun gear S1 is connected to the first motor M1. The first ring gear R1 is connected to the transmitting member 18. When the three elements of the first planetary gear unit 24, that is, the first sun gear S1, the first carrier CA1, and the first ring gear R1 can be rotated relative to each other, the power split mechanism 16 having the above-described configuration is placed in a differential mode in which the differential action can be performed, that is, the differential action is performed. Thus, the output from the engine 8 is distributed to the first motor M1 and the transmitting member 18. Also, electric energy is generated by the first motor M1 using part of the output from the engine 8 that is distributed to the first motor M1, and the generated electric energy is accumulated, or used to rotate the second motor M2. Thus, the differential portion 11 (the power split mechanism 16) functions as an electric differential device. Accordingly, for example, the differential portion 11 is placed in a so-called continuously-variable transmission (CVT) mode (electric CVT mode). That is, the differential portion 11 continuously changes the rotational speed of the transmitting member 18, regardless of the rotational speed of the engine 8. That is, when the power split mechanism 16 is placed in the differential mode, the differential portion 11 is also placed in the differential mode. Thus, the differential portion 11 functions as the electric CVT in which a speed ratio γ0 (the rotational speed $N_{IN}$ of the input shaft 14/the rotational speed $N_{18}$ of the transmitting member 18) is continuously changed from the minimum value γ0min to the maximum value γ0max.

The automatic shift portion 20 includes a second planetary gear unit 26 of a single pinion type, a third planetary gear unit 28 of a single pinion type, and a fourth planetary gear unit 30 of a single pinion type. The automatic shift portion 20 functions as a stepped automatic transmission. That is, the automatic shift portion 20 is a planetary gear type automatic transmission with a plurality of gears. The second planetary gear unit 26 includes a second sun gear S2, a second planetary gear P2, a second carrier CA2, and a second ring gear R2. The second carrier CA2 supports the second planetary gear P2 such that the second planetary gear P2 rotates on its axis, and moves around the second sun gear S2. The second ring gear R2 engages with the second sun gear S2 via the second planetary gear P2. The second planetary gear unit 26 has a predetermined gear ratio ρ2 of, for example, approximately "0.562". The third planetary gear unit 28 includes a third sun gear S3, a third planetary gear P3, a third carrier CA3, and a third ring gear R3. The third carrier CA3 supports the third planetary gear P3 such that the third planetary gear P3 rotates on its axis, and moves around the third sun gear S3. The third ring gear R3 engages with the third sun gear S3 via the third planetary gear P3. The third planetary gear unit 28 has a predetermined gear ratio ρ3 of, for example, approximately "0.425". The fourth planetary gear unit 30 includes a fourth sun gear S4, a fourth planetary gear P4, a fourth carrier CA4, and a fourth ring gear R4. The fourth carrier CA4 supports the fourth planetary gear P4 such that the fourth planetary gear P4 rotates on its axis, and moves around the fourth sun gear S4. The fourth ring gear R4 engages with the fourth sun gear S4 via the fourth planetary gear P4. The fourth planetary gear unit 30 has a predetermined gear ratio ρ4 of, for example, approximately "0.421". The gear ratio ρ2 is equal to ZS2/ZR2. In this equation, ZS2 represents the number of teeth of the second sun gear S2, and ZR2 represents the number of teeth of the second ring gear R2. The gear ratio ρ3 is equal to ZS3/ZR3. In this equation, ZS3 represents the number of teeth of the third sun gear S3. ZR3 represents the number of teeth of the third ring gear R3. The gear ratio ρ4 is equal to ZS4/ZR4. In this equation, ZS4 represents the number of teeth of the fourth sun gear S4. ZR4 represents the number of teeth of the fourth ring gear R4.

In the automatic shift portion 20, the second sun gear S2 and the third sun gear S3, which are integrally connected to each other, are selectively connected to the transmitting member 18 via the second clutch C2. Also, the second sun gear S2 and the third sun gear S3 are selectively connected to the case 12 via the first brake B1. The second carrier CA2 is selectively connected to the case 12 via the second brake B2. The fourth ring gear R4 is selectively connected to the case 12 via the third brake B3. The second ring gear R2, the third carrier CA3, and the fourth carrier CA4, which are integrally connected to each other, are connected to the output shaft 22. The third ring gear R3 and the fourth sun gear S4, which are integrally connected to each other, are selectively connected to the transmitting member 18 via the first clutch C1.

Thus, the automatic shift portion 20 is selectively connected to the differential portion 11 (the transmitting member 18) via the first clutch C1 or the second clutch C2 that is used to select each gear of the automatic shift portion 20. In other words, each of the first clutch C1 and the second clutch C2 functions as an engagement device that selectively switches the state of the power transmission path between the transmitting member 18 and the automatic shift portion 20, that is, the power transmission path from the differential portion 11 (the transmitting member 18) to the drive wheels 34. The state of the power transmission path is selectively switched between a power-transmission permitted state and a power-transmission interrupted state. When the power transmission path is in the power-transmission permitted state, the transmission of power is permitted. When the power transmission path is in the power-transmission interrupted state, the transmission of power is interrupted. That is, when at least one of the first clutch C1 and the second clutch C2 is engaged, the power transmission path is placed in the power-transmission permitted state. When the first clutch C1 and the second clutch C2 are disengaged, the power transmission path is placed in the power-transmission interrupted state.

When a hydraulic frictional engagement device that needs to be disengaged (hereinafter, referred to as "disengagement-side engagement device") is disengaged, and a hydraulic frictional engagement device that needs to be engaged (hereinafter, referred to as "engagement-side engagement device") is engaged in the automatic shift portion 20, a clutch-to-clutch shift is performed. As a result, one of the first gear to the fourth shift, or the reverse gear, or the neutral state is selected. Thus, the speed ratio γ (=the rotational speed $N_{18}$ of the transmitting member 18/the output-shaft rotational speed $N_{OUT}$ of the output shaft 22) at each gear is achieved. The speed ratio γ changes substantially geometrically. As shown in an engagement operation table in FIG. 2, for example, when the shift mechanism 10 functions as the stepped transmission, the first gear, at which a speed ratio γ1 is set to the maximum value, for example, approximately "3.357", is selected by engaging the first clutch C1 and the third brake B3. The second gear, at which a speed ratio γ2 is set to a value smaller than the speed ratio γ1, for example, approximately "2.180", is selected by engaging the first clutch C1 and the second brake B2. The third gear, at which a speed ratio γ3 is set to a value smaller than the speed ratio γ2, for example, approximately "1.424", is selected by engaging the first clutch C1 and the first brake B1. The fourth gear, at which a speed ratio γ4 is set to a value smaller than the speed ratio γ3, for example, approximately "1.000", is selected by engaging the first clutch C1 and the second clutch C2. The "reverse gear", at which a speed ratio γR is set to a value between the speed ratios γ1 and γ2, for example, approximately "3.209", is selected by engaging the second clutch C2 and the third brake B3. The neutral state "N" is selected by disengaging the first clutch C1, the second clutch C2, the first brake B1, the second brake B2, and the third brake B3.

The first clutch C1, the second clutch C2, the first brake B1, the second brake B2, and the third brake B3 (hereinafter, collectively referred to as "clutches C" and "brakes B" unless a specific clutch or a specific brake needs to be distinguished from the other clutches or the other brakes) are hydraulic frictional engagement devices that are generally used in conventional automatic transmissions. Each of the clutches C and the brakes B may be a wet multiple disc type clutch and brake in which a plurality of stacked frictional plates are pressed by a hydraulic actuator. Each of the brakes B may be a band brake in which one or two bands is (are) wound around the outer peripheral surface of a drum that is rotated, and the end(s) of the one or two bands is (are) tightened by a hydraulic actuator. Each of the clutches C and the brakes B selectively connects members that are provided on both sides thereof.

In the shift mechanism 10 that has the above-described configuration, the CVT is formed by combining the differential portion 11 that functions as the CVT with the automatic shift portion 20. When the speed ratio of the differential portion 11 is controlled to be constant, the stepped transmission is substantially formed by combining the differential portion 11 with the automatic shift portion 20.

More specifically, when the differential portion 11 functions as the CVT, and the automatic shift portion 20, which is connected to the differential portion 11 in series, functions as the stepped transmission, the rotational speed input to the automatic shift portion 20 (hereinafter, referred to as "input rotational speed for the automatic shift portion 20") at at least one gear M of the automatic shift portion 20, that is, the rotational speed of the transmitting member 18 (hereinafter, referred to as "transmitting-member rotational speed $N_{18}$") is continuously changed. As a result, the speed ratio is continuously changed in a certain range at the at least one gear M. Accordingly, the total speed ratio γT of the shift mechanism 10 (=the rotational speed $N_{IN}$ of the input shaft 14/the rotational speed $N_{OUT}$ of the output shaft 22) is continuously changed. Thus, the CVT is formed in the shift mechanism 10. The total speed ratio γT of the shift mechanism 10 is determined based on the speed ratio γ0 of the differential portion 11 and the speed ratio γ of the automatic shift portion 20.

For example, the transmitting-member rotational speed $N_{18}$ is continuously changed at each of the first gear to the fourth gear, and the reverse gear of the automatic shift portion 20 shown in the engagement operation table in FIG. 2. Thus, the speed ratio is continuously changed in a certain range at each of the first gear to the fourth gear, and the reverse gear. As a result, the speed ratio is continuously changed between the first gear and the second gear, between the second gear and the third gear, and between the third gear and the fourth gear. Accordingly, the total speed ratio γT of the entire shift mechanism 10 is continuously changed. The ratio of the speed ratio at a gear to a speed ratio at an adjacent higher gear (i.e., step) is shown in the section "STEP" in FIG. 2. As shown in the section "TOTAL" in FIG. 2, the ratio of the speed ratio at first gear to the speed ratio at the fourth gear is 3.36.

When the speed ratio of the differential portion 11 is controlled to be constant, and the clutches C and the brakes B are selectively engaged to select any one of the first gear to the fourth gear, and the reverse gear, the total speed ratio γT of the entire shift mechanism 10 at each gear is achieved. The total speed ratio γT changes substantially geometrically. Accordingly, in the shift mechanism 10, the stepped transmission is substantially formed.

For example, when the speed ratio γ0 of the differential portion 11 is controlled to be fixed to "1", the total speed ratio γT of the shift mechanism 10 at each of the first gear to the fourth gear, and the reverse gear of the automatic shift portion 20 is achieved, as shown in the engagement operation table in FIG. 2. When the speed ratio γ0 of the differential portion 11 is fixed to a value smaller than "1", for example, approximately 0.7, at the fourth gear of the automatic shift portion 20, the total speed ratio γT is set to a value smaller than "1" at the fourth gear, for example, approximately "0.7".

Figure 3:
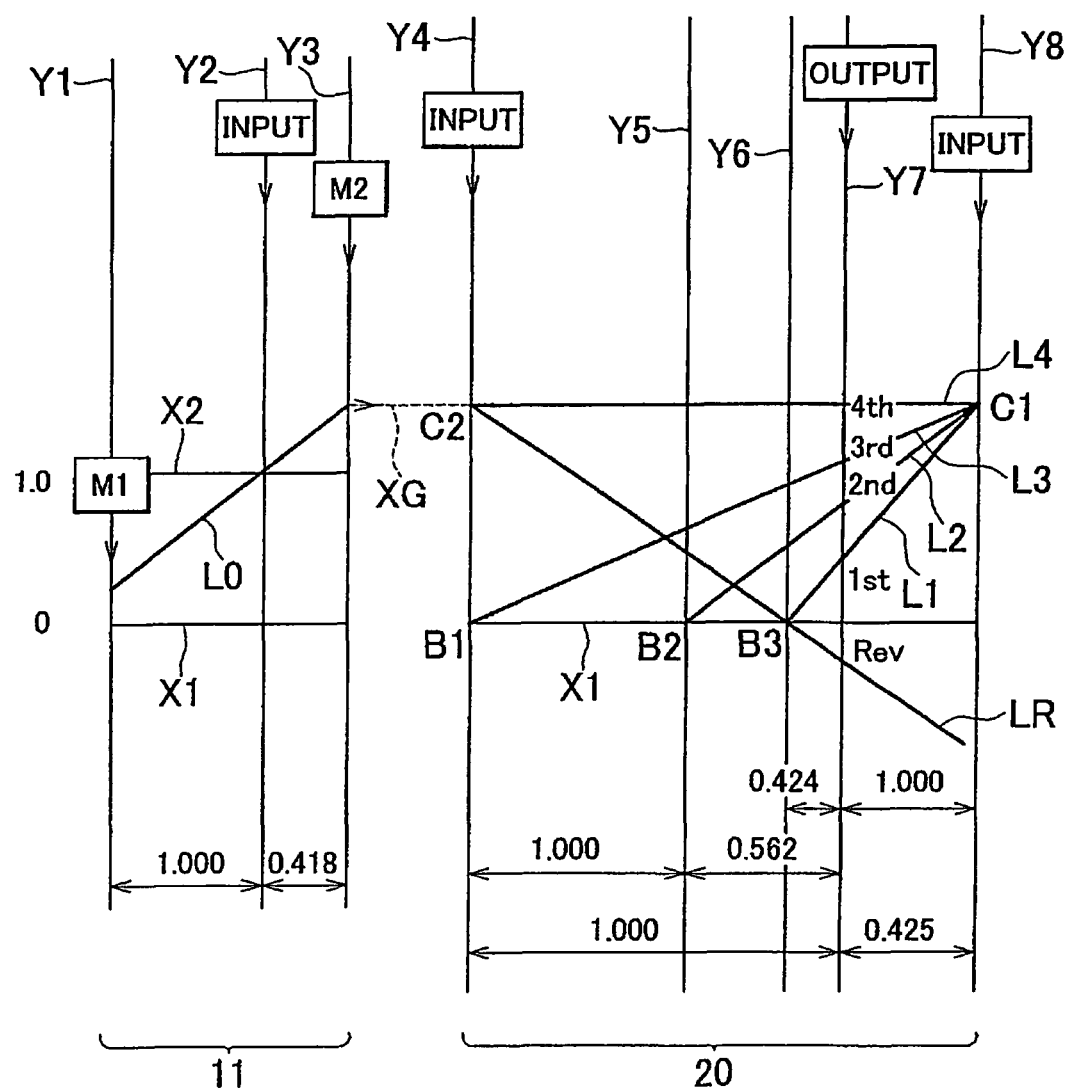
FIG. 3 is a collinear diagram explaining the relative rotational speeds at each gear in the drive apparatus in FIG. 1.

FIG. 3 is a collinear diagram in which straight lines indicate the relative relation among the rotational speeds of the rotational elements in the shift mechanism 10 that includes the differential portion 11 and the automatic shift portion 20. Each of the rotational elements is in a connected state or disconnected state at each gear. The collinear diagram in FIG. 3 is a two-dimensional coordinate. In the collinear diagram in FIG. 3, the horizontal axis indicates the relation among the gear ratios ρ (ρ1, ρ2, ρ3, and ρ4) of the planetary gear units 24, 26, 28, and 30, and the vertical axis indicates relative rotational speeds. The horizontal line X1 among the three horizontal lines indicates the rotational speed of "0". The horizontal line X2 indicates the rotational speed of "1.0", that is, a rotational speed $N_E$ of the engine 8 connected to the input shaft 14. The horizontal line XG indicates the rotational speed of the transmitting member 18.

The three vertical lines Y1, Y2, and Y3 indicate the relative rotational speeds of the three rotational elements of the power split mechanism 16 that constitutes the differential portion 11. That is, the vertical line Y1 indicates the relative rotational speed of the first sun gear S1 that is regarded as a second rotational element (second element) RE2. The vertical line Y2 indicates the relative rotational speed of the first carrier CA1 that is regarded as a first rotational element (first element) RE1. The vertical line Y3 indicates the relative rotational speed of the first ring gear R1 that is regarded as a third rotational element (third element) RE3. The intervals between the vertical lines Y1 and Y2, and between the vertical lines Y2 and Y3 are set based on the gear ratio ρ1 of the first planetary gear unit 24. Further, the five vertical lines Y4, Y5, Y6, Y7, and Y8 indicate the relative rotational speeds of the rotational elements of the automatic shift portion 20. That is, the vertical line Y4 indicates the relative rotational speed of the second sun gear S2 and the third sun gear S3, which are connected to each other, and which are regarded as a fourth rotational element (fourth element) RE4. The vertical line Y5 indicates the relative rotational speed of the second carrier CA2 that is regarded as a fifth rotational element (fifth element) RE5. The vertical line Y6 indicates the relative rotational speed of the fourth ring gear R4 that is regarded as a sixth rotational element (sixth element) RE6. The vertical line Y7 indicates the relative rotational speed of the second ring gear R2, the third carrier CA3, and the fourth carrier CA4, which are connected to each other, and which are regarded as a seventh rotational element (seventh element) RE7. The vertical line Y8 indicates the relative rotational speed of the third ring gear R3 and the fourth sun gear S4, which are connected to each other, and which are regarded as an eighth rotational element (eighth element) RE8. The intervals between the vertical lines are set based on the gear ratios ρ2 of the second planetary gear unit 26, the gear ratio ρ3 of the third planetary gear unit 28, and the gear ratio ρ4 of the fourth planetary gear unit 30. In the collinear diagram, the interval between the sun gear and the carrier is set to indicate "1". The interval between the carrier and the ring gear is set to indicate the gear ratio ρ (ρ1, ρ2, ρ3, or ρ4). That is, in the differential portion 11, the interval between the vertical lines Y1 and Y2 is set to indicate "1", and the interval between the vertical lines Y2 and Y3 is set to indicate the gear ratio ρ1. In the automatic shift portion 20, the interval between the sun gear and the carrier in each of the second planetary gear unit 26, the third planetary gear unit 28, and the fourth planetary gear unit 30 is set to indicate "1". The interval between the carrier and the ring gear in each of the second planetary gear unit 26, the third planetary gear unit 28, and the fourth planetary gear unit 30 is set to indicate the gear ratio ρ (ρ2, ρ3, or ρ4).

As shown in the collinear diagram in FIG. 3, in the power splint mechanism 16 (the differential portion 11) in the shift mechanism 10 in the embodiment, the first rotational element RE1 (the first carrier CA1) is connected to the input shaft 14, that is, the engine 8, and the second rotational element RE2 is connected to the first motor M1, and the third rotational element (the first ring gear R1) RE3 is connected to the transmitting member 18 and the second motor M2. Thus, the rotation of the input shaft 14 is transmitted (input) to the automatic shift portion 20 via the transmitting member 18. In this case, the oblique straight line L0 that passes through the intersection of the lines Y2 and X2 indicates the relation between the rotational speed of the first sun gear S1 and the rotational speed of the first ring gear R1.

For example, the differential portion 11 may be placed in the differential mode so that the first rotational element RE1 to the third rotational element RE3 can be rotated relative to each other, and the rotational speed of the first ring gear R1, may be substantially constant. In this case, when the rotational speed of the first sun gear S1 is increased or decreased by controlling the rotational speed of the first motor M1, the rotational speed of the first carrier CA1, that is, the engine speed $N_E$ is increased or decreased. The rotational speed of the first ring gear R1 is indicated by the intersection of the straight line L0 and the vertical line Y3, and depends on a vehicle speed V. The rotational speed of the first sun gear S1 is indicated by the intersection of the straight line L0 and the vertical line Y1. The rotational speed of the first carrier CA1 is indicated by the intersection of the straight line L0 and the vertical line Y2.

When the rotational speed of the first sun gear S1 is made equal to the rotational speed of the engine speed $N_E$ by controlling the rotational speed of the first motor M1 so that the speed ratio γ0 of the differential portion 11 is fixed to "1", the straight line L0 matches the horizontal line X2. Thus, the transmitting member 18 is rotated such that the rotational speed of the first ring gear R1 is equal to the engine speed $N_E$. When the rotational speed of the first sun gear S1 is made 0 by controlling the rotational speed of the first motor M1 so that the speed ratio γ0 of the differential portion 11 is fixed to a value smaller than "1", for example, approximately 0.7, the transmitting member 18 is rotated at the transmitting-member rotational speed $N_1$, which is higher than the engine speed $N_E$.

In the automatic shift portion 20, the fourth rotational element RE4 is selectively connected to the transmitting member 18 via the second clutch C2, and selectively connected to the case 12 via the first brake B1. The fifth rotational element RE5 is selectively connected to the case 12 via the second brake B2. The sixth rotational element RE6 is selectively connected to the case 12 via the third brake B3. The seventh rotational element RE7 is connected to the output shaft 22. The eighth rotational element RE8 is selectively connected to the transmitting member 18 via the first clutch C1.

When the straight line L0 matches the horizontal line X2 in the differential portion 11, and the rotational speed that is equal to the engine speed $N_E$ is input to the eighth rotational element RE8 from the differential portion 11, the rotational speed of the output shaft 22 at the first gear is indicated by the intersection of the oblique straight line L1 and the vertical line Y7 in the automatic shift portion 20, as shown in FIG. 3. The straight line L1 is set by engaging the first clutch C1 and the third brake B3. The straight line L1 passes through the intersection of the vertical line Y8 that indicates the rotational speed of the eighth rotational element RE8 and the horizontal line X2, and the intersection of the vertical line Y6 that indicates the rotational speed of the sixth rotational element RE6 and the horizontal line X1. The vertical line Y7 indicates the rotational speed of the seventh rotational element RE7 connected to the output shaft 22. Similarly, the rotational speed of the output shaft 22 at the second gear is indicated by the intersection of the oblique straight line L2 and the vertical line Y7. The straight line L2 is set by engaging the first clutch C1 and the second brake B2. The rotational speed of the output shaft 22 at the third gear is indicated by the intersection of the oblique straight line L3 and the vertical line Y7. The straight line L3 is set by engaging the first clutch C1 and the first brake B1. The rotational speed of the output shaft 22 at the fourth gear is indicated by the intersection of the horizontal straight line L4 and the vertical line Y7. The straight line L4 is set by engaging the first clutch C1 and the second clutch C2.

Figure 4:
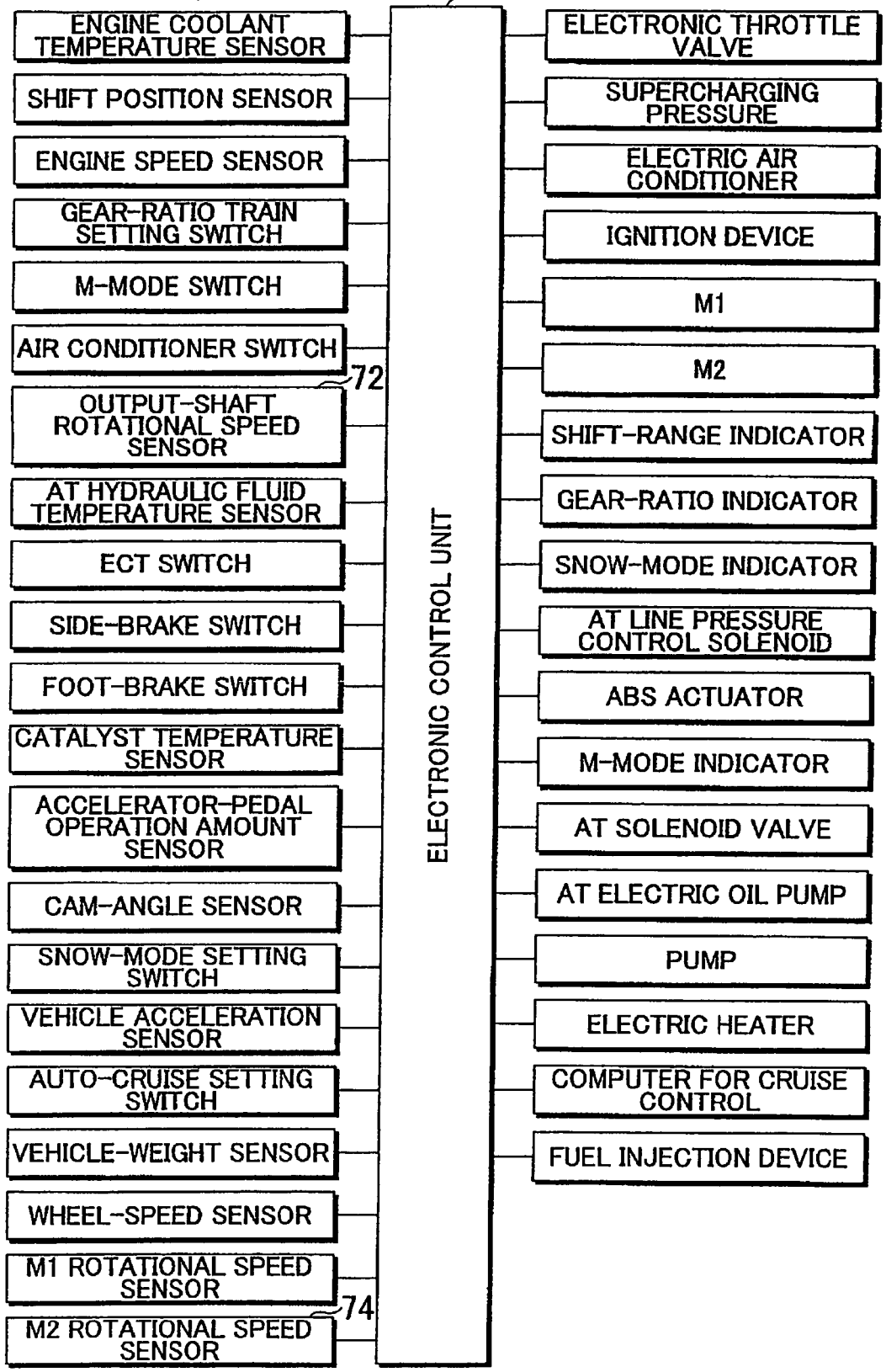
FIG. 4 is a diagram explaining signals input to and output from an electronic control unit provided in the drive apparatus in FIG. 1.

FIG. 4 shows signals that are input to an electronic control unit 80, and signals that are output from the electronic control unit 80 to control the shift mechanism 10 in the embodiment. The electronic control unit 80 includes a so called microcomputer, that includes a CPU, ROM, RAM, and an input/output interface. The electronic control unit 80 executes a hybrid drive control relating to the engine 8, and the first and second motors M1 and M2, and a drive control including a shift control for the automatic shift portion 20, by processing the signals according to programs that are prestored in the ROM, using the temporary storage function of the RAM.

The electronic control unit 80 receives the signals from sensors and switches shown in FIG. 4. That is, the electronic control unit 80 receives a signal indicating an engine coolant temperature $T_{EMPW}$, a signal indicating a shift position $P_{SH}$ at which a shift lever 52 (refer to FIG. 6) is placed, a signal indicating the number of times that the shift lever 52 is operated at the position "M", a signal indicating the engine speed $N_E$ that is the rotational speed of the engine 8, a signal indicating a gear-ratio train set value, a signal providing an instruction for a manual mode (M-mode), a signal indicating the operation of an air conditioner, a signal indicating the vehicle speed V which depends on the rotational speed NO of the output shaft 22, a signal indicating the temperature $T_{OIL}$ of hydraulic oil in the automatic shift portion 20, a signal indicating the setting of a power mode (output from an ECT switch), a signal indicating the operation of an emergency brake, a signal indicating the operation of a foot brake, a signal indicating a catalyst temperature, a signal indicating the operation amount of an accelerator pedal (i.e., an accelerator-pedal operation amount Acc) which depends on the amount of output required by a driver, a signal indicating a cam angle, a signal indicating the setting of a snow mode, a signal indicating longitudinal acceleration G, a signal indicating an auto-cruise mode, a signal indicating the weight of the vehicle, a signal indicating the wheel speed of each wheel, a signal indicating the rotational speed $N_{M1}$ of the first motor M1 (hereinafter, referred to as "first-motor rotational speed $N_{M1}$"), a signal indicating the rotational speed $N_{M2}$ of the second motor M2 (hereinafter, referred to as "second-motor rotational speed $N_{M2}$", a signal indicating the state of charge SOC in an electric power storage device 56 (refer to FIG. 7), and the like.

The electronic control unit 80 outputs control signals to an engine output control device 58 (refer to FIG. 7) that controls the output from the engine 8. For example, the electronic control unit 80 outputs a drive signal to a throttle actuator 64 to control the throttle-valve opening amount $\theta_{TH}$ of an electronic throttle valve 62 provided in the intake pipe 60 of the engine 8, a fuel-supply amount signal that controls the amount of fuel supplied by a fuel injection device 66 to the intake pipe 60 or the cylinder of the engine 8, and an ignition signal that provides an instruction for the timing at which an ignition device 68 ignites the fuel in the engine 8. The electronic control unit 80 also outputs a supercharging-pressure adjustment signal that adjusts supercharging pressure, an electric air-conditioner drive signal that operates the electric air conditioner, an instruction signal that provides an instruction for the operation of the motors M1 and M2, a shift position (operational position) indication signal that operates a shift indicator, a gear-ratio indication signal that causes a gear-ratio indicator to indicate the gear ratio, a snow-mode indication signal that causes a snow-mode indicator to indicate that the snow mode is selected, an ABS operation signal that operates an ABS (anti-locking braking system) actuator that prevents the slip of the wheels at the time of braking, a M-mode indication signal that causes a M-mode indicator to indicate that the M-mode is selected, a valve-instruction signal that operates electromagnetic valves (linear solenoid valves) in a hydraulic control circuit 70 (refer to FIG. 5 and FIG. 7) to control hydraulic actuators for the hydraulic frictional engagement devices in the differential portion 11 and the automatic shift portion 20, a drive instruction signal that operates an electric hydraulic pump for supplying a hydraulic pressure that is used as a basic pressure when a line pressure $P_L$ is regulated using a regulator valve provided in the hydraulic control circuit 70, a signal that drives an electric heater, a signal for a computer used for the cruise control, and the like.

Figure 5:
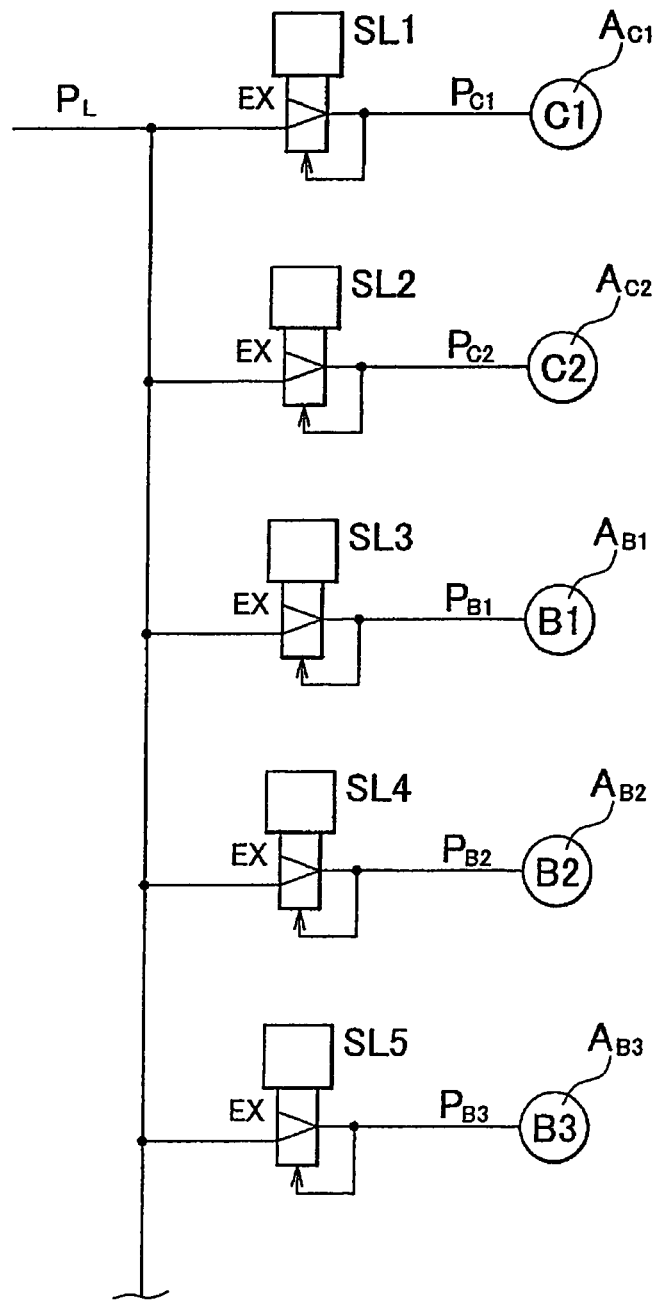
FIG. 5 is a circuit diagram relating to linear solenoid valves that control hydraulic actuators for clutches C and brakes B, in a hydraulic control circuit.

FIG. 5 is a circuit diagram relating to linear solenoid valves SL1 to SL5 in the hydraulic control circuit 70. The linear solenoid valves SL1 to SL5 controls the operations of hydraulic actuators (hydraulic cylinders) $A_{C1}$, $A_{C2}$, $A_{B1}$, $A_{B2}$, and $A_{B3}$ for the clutches C1 and C2, and the brakes B1 to B3, respectively.

In FIG. 5, according to instruction signals from the electronic control unit 80, the linear solenoid valves SL1 to SL5 regulate engagement pressures $P_{C1}$, $P_{C2}$, $P_{B1}$, $P_{B2}$, and $P_{B3}$, respectively, using a line pressure PL. Then, the engagement pressures $P_{C1}$, $P_{C2}$, $P_{B1}$, $P_{B2}$, and $P_{B3}$ are directly supplied to the actuators $A_{C1}$, $A_{C2}$, $A_{B1}$, $A_{B2}$, and $A_{B3}$, respectively. For example, a relief regulator valve regulates the line pressure PL to a value according to an engine load or the like represented by the accelerator-pedal operation amount or a throttle-valve opening amount, using a hydraulic pressure generated by a mechanical oil pump rotated by an electric oil pump (not shown) or the engine 8, as a basic pressure.

The linear solenoid valves SL1 to SL5 basically have the same configuration. The electronic control unit 80 energizes/de-energizes the linear solenoid valves SL1 to SL5, independently. Thus, the hydraulic pressures for the hydraulic actuators $A_{C1}$, $A_{C2}$, $A_{B1}$, $A_{B2}$, and $A_{B3}$ are regulated independently. Accordingly, the engagement pressures $P_{C1}$, $P_{C2}$, $P_{B1}$, $P_{B2}$, and $P_{B3}$ for the clutches C1 to C4, and the brakes B1 and B2 are controlled independently. In the automatic shift portion 20, each gear is selected by engaging predetermined engagement devices, for example, as shown in the engagement operation table in FIG. 2. In the shift control for the automatic shift portion 20, for example, engagement and disengagement of the clutch C and the brake B relating to the shift are simultaneously controlled, that is, the so-called clutch-to-clutch shift is performed.

Figure 6:
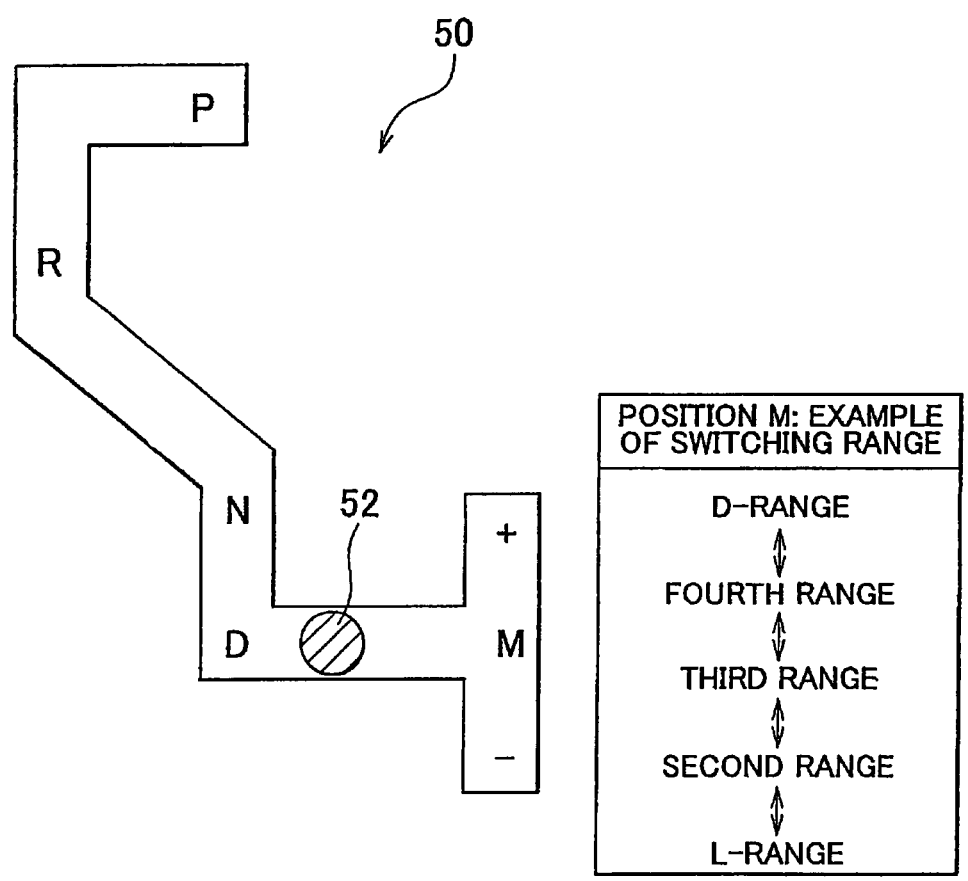
FIG. 6 shows an example of a shift operation device that includes a shift lever, and that is operated to select a shift position among a plurality of positions.

FIG. 6 is an example of a diagram showing a shift operation device 50. The shift operation device 50 is a switching device that switches the shift position $P_{SH}$ among a plurality of positions according to the operation performed by the driver. The shift operation device 50 is provided, for example, on the side of a driver's seat. The shift operation device 50 includes the shift lever 52 that is operated to select the shift position $P_{SH}$ among the plurality of positions.

The shift lever 52 is manually moved to one of a parling position "P (Parking)", a reverse position "R (Reverse)", a neutral position "N (Neutral)", an automatic-shift forward-running position "D (Drive)", and a manual-shift forward-running position "M (Manual)". When the shift lever 52 is at the position "P (Parking)", the transmission of power is interrupted in the power transmission path in the shift mechanism 10, that is, in the automatic shift portion 20 so that the shift mechanism 10 is in the neutral state, and the output shaft of the automatic shift portion 20 is locked. When the shift lever 52 is at the position "R (Reverse)", the vehicle backs up. When the shift lever 52 is at the position "N (Neutral)", the transmission of power is interrupted in the power transmission path in the shift mechanism 10 so that the shift mechanism 10 is placed in the neutral state. When the shift lever 52 is at the position "D (Drive)", an automatic shift control is executed to select the total speed ratio γT of the shift mechanism 10 in a range in which the total speed ratio γT can be changed. The total speed ratio γT is determined based on the speed ratio of the differential portion 11 and the speed ratio of the automatic shift portion 20 at each gear. The speed ratio of the differential portion 11 is continuously changed in a certain range. The gear of the automatic shift portion 20 is selected among the first gear to the fourth gear by the automatic shift control. When the shift lever 52 is at the position "M (Manual)", a manual shift mode (manual mode) is selected to set so-called shift ranges by restricting the use of the high gear(s) of the automatic shift portion 20 that is (are) used in the automatic shift control.

When the shift lever 52 is manually moved to the shift position $P_{SH}$ among the above-described positions, for example, the state of the hydraulic control circuit 70 is electrically switched to select one of the reverse gear "R", the neutral state "N", the gears in the forward gear "D", and the like shown in the engagement operation table in FIG. 2.

Among the positions "P" to "M", each of the positions "P" and "N" is a non-running position that is selected to stop the vehicle from running. When the shift lever 52 is at the position "P" or "N", for example, both of the first clutch C1 and the second clutch C2 are disengaged, as shown in the engagement operation table in FIG. 2. That is, each of the positions "P" and "N" is a non-drive position for switching the state of the power transmission path in the automatic shift portion 20 to the power-transmission interrupted state by disengaging the first clutch C1 and the second clutch C2 so that the transmission of the power is interrupted in the power transmission path and the vehicle cannot be driven. Each of the positions "R", "D", and "M" is a running position that is selected to cause the vehicle to run. When the shift lever 52 is at the position "R", "D", or "M", for example, at least one of the first clutch C1 and the second clutch C2 is engaged as shown in the engagement operation table in FIG. 2. That is, each of the positions "R", "D", and "M" is a drive position for switching the state of the power transmission path in the automatic shift portion 20 to the power-transmission permitted state by engaging the first clutch C1 and/or the second clutch C2 so that the transmission of power is permitted in the power transmission path and the vehicle can be driven.

More specifically, when the shift lever 52 is manually moved from the position "P" or "N" to the position "R", the state of the power transmission path in the automatic shift portion 20 is switched from the power-transmission interrupted state to the power-transmission permitted state by engaging the second clutch C2. When the shift lever 52 is manually moved from the position "N" to the position "D", the state of the power transmission path in the automatic shift portion 20 is switched from the power-transmission interrupted state to the power-transmission permitted state by engaging at least the first clutch C1. When the shift lever 52 is manually moved from the position "R" to the position "P" or "N", the state of the power transmission path in the automatic shift portion 20 is switched from the power-transmission permitted state to the power-transmission interrupted state by disengaging the second clutch C2. When the shift lever 52 is manually moved from the position "D" to the position "N", the state of the power transmission path in the automatic shift portion 20 is switched from the power-transmission permitted state to the power-transmission interrupted state by disengaging the first clutch C1 and the second clutch C2.

Figure 7:
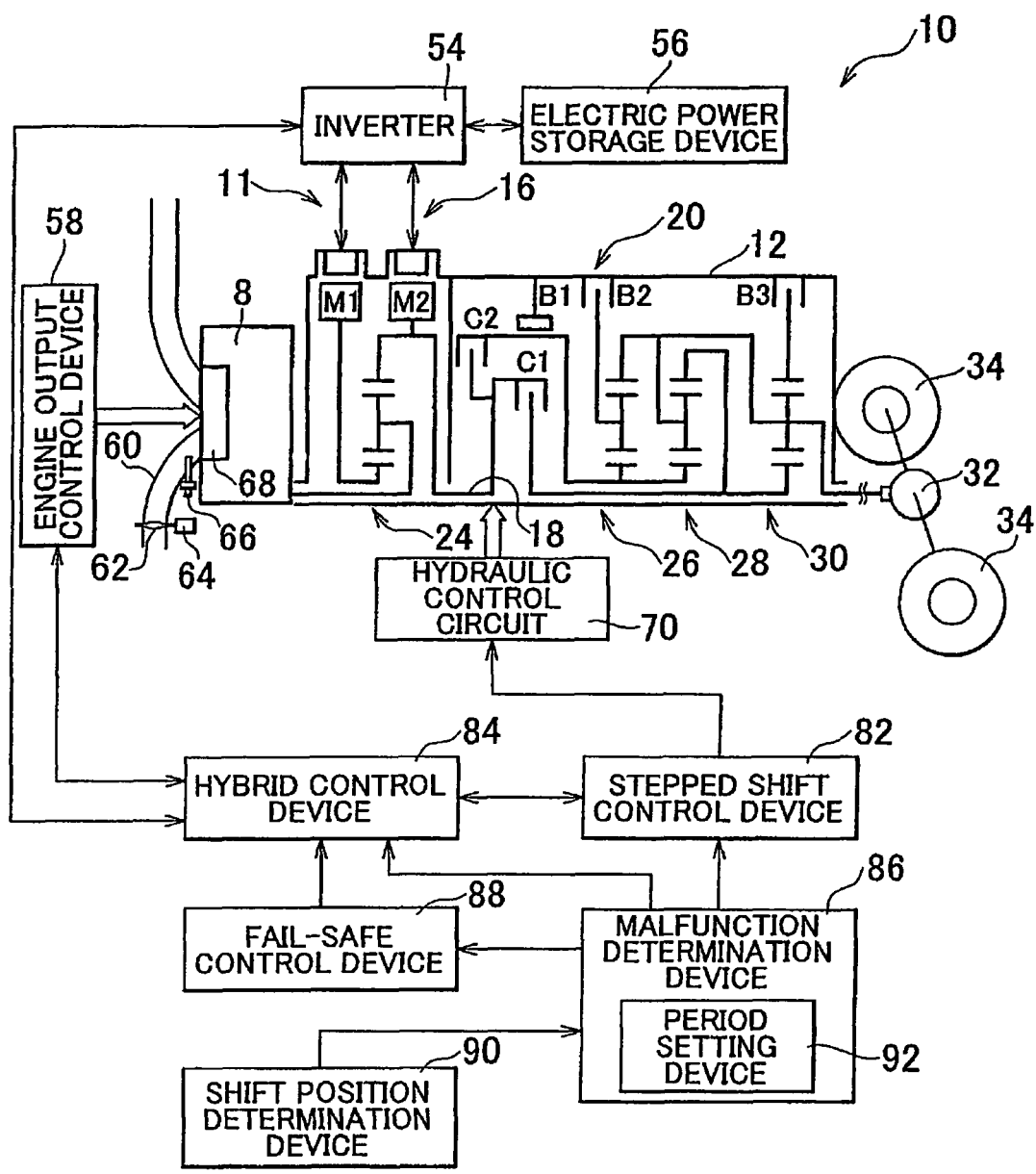
FIG. 7 is a function block diagram explaining the main part of a control operation performed by the electronic control unit in FIG. 4.
Figure 8:
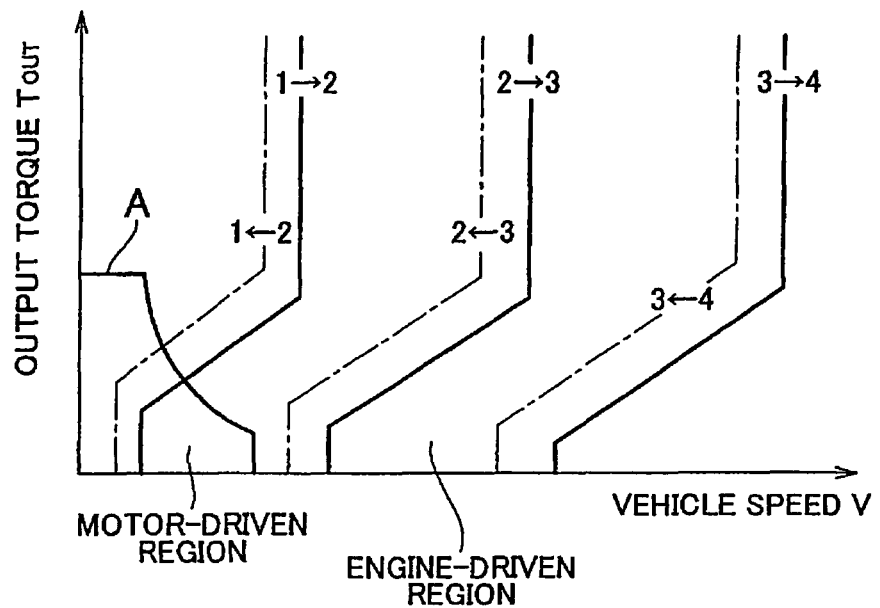
FIG. 8 shows an example of a shift map used in a shift control for the drive apparatus, and an example of a driving power source switching map used in a driving power source switching control that switches a drive mode between an engine-driven mode and a motor-driven mode, and FIG. 8 also shows the relation between the shift map and the driving power source switching map.

FIG. 7 is a function block diagram explaining the main part of the control operation performed by the electronic control unit 80. In FIG. 7, a stepped shift control device 82 determines whether the automatic shift portion 20 should shift, based on the vehicle condition indicated by the actual vehicle speed V and a required torque $T_{OUT}$ output from the automatic shift portion 20, using a prestored shift diagram (i.e., a shift relation, or a shift map) in which the vehicle speed V and the output torque $T_{OUT}$ are used as parameters, and upshift lines (solid lines) and downshift lines (chain lines) are provided, as shown in FIG. 8. That is, the stepped shift control device 82 determines the gear to which the automatic shift portion 20 should shift, based on the vehicle condition, using the shift diagram. Then, the stepped shift control device 82 executes an automatic shift control so that the automatic shift portion 20 shifts to the determined gear.

At this time, the stepped shift control device 82 provides the instruction (i.e., an instruction for output for shift, or a hydraulic pressure instruction) to the hydraulic control circuit 70 to engage and/or disengage the hydraulic frictional engagement devices relating to the shift of the automatic shift portion 20 so that the automatic shift portion 20 shifts to the determined gear according to, for example, the engagement operation table shown in FIG. 2. That is, the stepped shift control device 82 outputs the instruction to the hydraulic control circuit 70 to disengage the disengagement-side engagement device relating to the shift of the automatic shift portion 20, and to engage the engagement-side engagement device relating to the shift of the automatic shift portion 20, thereby performing the clutch-to-clutch shift. According to the instruction, for example, the hydraulic control circuit 70 operates the hydraulic actuators for the hydraulic frictional engagement devices relating to the shift by operating the linear solenoid valves SL in the hydraulic control circuit 70. Thus, the disengagement-side engagement device relating to the shift is disengaged, and the engagement-side engagement device relating to the shift is engaged so that the automatic shift portion 20 shifts to the determined gear.

A hybrid control device 84 operates the engine 8 efficiently, and controls the speed ratio γ0 of the differential portion 11 that functions as the electric CVT, by optimizing the ratio between the driving power provided by the engine 8 and the driving power provided by the second motor M2, and optimizing the reaction force borne by the first motor M1 while the first motor M1 generates electric power. For example, the hybrid control device 84 calculates a target (required) output for driving the vehicle based on the accelerator-pedal operation amount Acc, which indicates the amount of output required by the driver, and the vehicle speed V; calculates a total target output based on the target output for driving the vehicle and a required output for charging the electric power storage device 56; calculates a target engine output so that the total target output can be obtained, taking into account a transfer loss, loads of auxiliary machines, an assist torque provided by the second motor M2, and the like; and controls the engine speed $N_E$ and the engine torque $T_E$ of the engine 8 to obtain the engine output that matches the target engine output, and controls the amount of electric power generated by the first motor M1.

Figure 9:
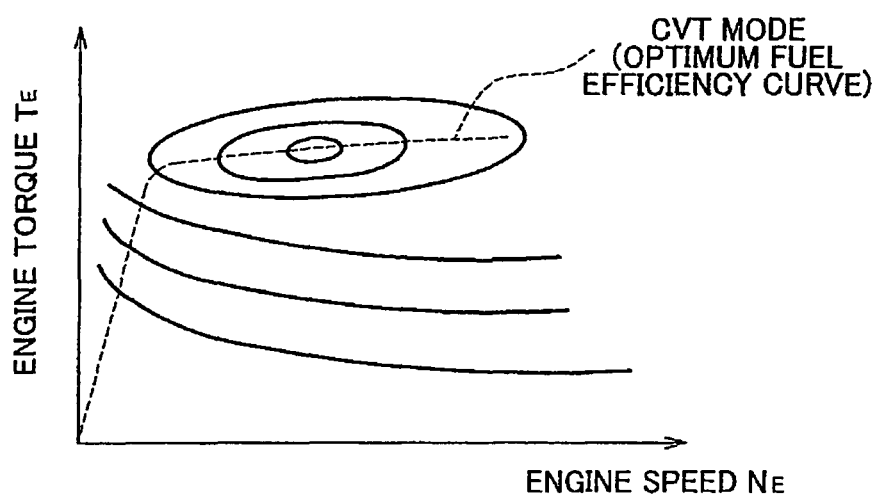
FIG. 9 is a diagram showing the relation between an engine speed and engine torque, that is, an example of a fuel efficiency map in which a dash line is an optimum fuel efficiency curve.

For example, the hybrid control device 84 executes the hybrid control to improve the power performance, the fuel efficiency, and the like, taking into account the gear of the automatic shift portion 20. During this hybrid control, the differential portion 11 functions as the electric CVT to coordinate the engine speed $N_E$ and the vehicle speed V, which are set to operate the engine 8 efficiently, and the rotational speed of the transmitting member 18, which is set by the gear of the automatic shift portion 20. That is, the hybrid control device 84 sets the target value of the total speed ratio γT of the shift mechanism 10 so that the engine 8 operates according to an optimum fuel efficiency curve (i.e., a fuel efficiency map, a relational diagram) as indicated by the dash line in FIG. 9. The optimum fuel efficiency curve is empirically obtained in advance in a two-dimension coordinate constituted by the engine speed $N_E$ and the torque $T_E$ output from the engine 8 (i.e., engine torque $T_E$) so that high driveability and high fuel efficiency are achieved when the vehicle is driven in the CVT mode. The optimum fuel efficiency curve is stored. For example, the hybrid control device 84 sets the target value of the total speed ratio $γ_T$ of the shift mechanism 10 to control the engine torque $T_E$ and the engine speed $N_E$ to obtain the engine output that matches the target output (i.e., the total target output, or the required driving power). Then, the hybrid control device 84 controls the speed ratio γ0 of the differential portion 11, taking into the account the gear of the automatic shift portion 20, thereby controlling the total speed ratio γT in a range in which the total speed ratio γT can be changed.

At this time, the hybrid control device 84 supplies the electric energy generated by the first motor M1 to the electric power storage device 56 and the second motor M2 through an inverter 54. Therefore, although a large part of the power output from the engine 8 is mechanically transmitted to the transmitting member 18, part of the power output from the engine 8 is consumed by the first motor M1 to generate electric power. That is, part of the power output from the engine 8 is converted to electric energy in the first motor M1. The electric energy is supplied to the second motor M2 through the inverter 54, and the second motor M2 is driven. Thus, mechanical energy is transmitted from the second motor M2 to the transmitting member 18. The devices related to the process from the generation of the electric power to the consumption of the electric power in the second motor M2 constitute an electric path in which part of the power output from the engine 8 is converted to the electric energy, and the electric energy is converted to the mechanical energy.

The hybrid control device 84 can maintain the engine speed $N_E$ at a substantially constant value, or control the engine speed $N_E$ to any given value by using the electric CVT function of the differential portion 11 to control the first-motor rotational speed $N_{M1}$ and/or the second-motor rotational speed $N_{M2}$, regardless of whether the vehicle is stopped or driven. In other words, the hybrid control device 84 can control the first-motor rotational speed $N_{M1}$ and/or the second-motor rotational speed $N_{M2}$ to any given value(s), while maintaining the engine speed $N_E$ at a substantially constant value, or controlling the engine speed $N_E$ to any given value.

For example, as shown in the collinear diagram in FIG. 3, when the engine speed $N_E$ needs to be increased while the vehicle is driven, the hybrid control device 84 increases the first-motor rotational speed $N_{M1}$ while maintaining the second-motor rotational speed $N_{M2}$, which depends on the vehicle speed V (the rotational speed of drive wheels 34), to a substantially constant value. When the engine speed $N_E$ needs to be maintained at a substantially constant value during the shift of the automatic shift portion 20, the hybrid control device 84 increases the first-motor rotational speed $N_{M1}$ if the second-motor rotational speed $N_{M2}$ is decreased by the shift of the automatic shift portion 20 and the change in the vehicle speed V, and decreases the first-motor rotational speed $N_{M1}$ if the second-motor rotational speed $N_{M2}$ is increased by the shift of the automatic shift portion 20 and the change in the vehicle speed V, while maintaining the engine speed $N_E$ at a substantially constant value.

Also, the hybrid control device 84 has a function of executing an output control for the engine 8 so that the engine 8 generates the required output, by outputting at least one of the instruction for controlling opening/closing of the electronic throttle valve 62 using the throttle actuator 64, the instruction for controlling the amount of fuel injected by the fuel injection device 66, and the timing at which fuel is injected by the fuel injection device 66, and the instruction for controlling the timing at which the fuel is ignited by the ignition device 68 such as the igniter, to the engine output control device 58.

For example, the hybrid control device 84 basically executes a throttle control to drive the throttle actuator 64 based on the accelerator-pedal operation amount Acc according to a prestored relation (not shown). That is, the hybrid control device 84 basically executes the throttle control to increase the throttle-valve opening amount $\theta_{TH}$ as the accelerator-pedal operation amount Acc increases. The engine output control device 58 controls the engine torque, for example, by controlling the opening/closing of the electronic throttle valve 62 using the throttle actuator 64, controlling the fuel injection performed by the fuel injection device 66, and controlling the timing at which the fuel is ignited by the ignition device 68 such as the igniter, according to the instruction provided by the hybrid control device 84.

Also, the hybrid control device 84 can drive the vehicle in a motor-driven mode, using the electric CVT function (differential action) of the differential portion 11, regardless of whether the engine 8 is stopped or idling.

For example, the hybrid control device 84 determines whether the vehicle condition is in the motor-driven region or the engine-driven region, based on the vehicle condition indicated by the actual vehicle speed V and the required torque $T_{OUT}$ output from the automatic shift portion 20, using a prestored relational diagram (a driving power source switching diagram, a driving power source map) as shown in FIG. 8. In the relational diagram, the vehicle speed V and the required torque $T_{OUT}$ output from the automatic shift portion 20 are used as parameters. The relational diagram shown in FIG. 8 includes a boundary line between the engine-driven region and the motor-driven region, which is provided to switch the driving power source for starting and driving the vehicle between the engine 8 and the second motor M2. Then, the hybrid control device 84 drives the vehicle in the motor-driven mode or the engine-driven mode. For example, the driving power source switching diagram indicated by the solid line A in FIG. 8 is prestored, along with the shift map indicated by the solid lines and chain lines in FIG. 8. As evident from FIG. 8, for example, the hybrid control device 84 drives the vehicle in the motor-driven mode in a low output torque $T_{OUT}$ region, that is, in a low engine torque $T_E$ region where the engine efficiency is generally lower than that in a high torque region, or in a low vehicle speed region where the vehicle speed V is low, that is, a low load region.

When the vehicle is driven in the motor-driven mode, the hybrid control device 84 executes the control to suppress the drag of the engine 8 that is stopped, and to improve fuel efficiency. That is, when the vehicle is driven in the motor driven mode, the hybrid control device 84 controls the first motor M1 so that the first-motor rotational speed $N_{M1}$ is a negative value, for example, the hybrid control device 84 places the first motor M1 in a no-load state so that the first motor M1 is idling, thereby maintaining the engine speed $N_E$ at zero or substantially zero using the electric CVT function (differential action) of the differential portion 11, as required.

Even when the vehicle is driven in the engine-driven mode, the hybrid control device 84 can perform a so-called torque-assist operation to assist the engine 8, by supplying the electric energy to the second motor M2 from the first motor M1 via the electric path, and/or from the electric power storage device 56, and by driving the second motor M2 to apply torque to the drive wheels 34.

Also, the hybrid control device 84 can place the first motor M1 in a no-load state to permit the first motor M1 to idle. In this case, torque cannot be transmitted in the differential portion 11, that is, the transmission of power is substantially interrupted in the power transmission path in the differential portion 11, and no output is generated from the differential portion 11. That is, the hybrid control device 84 can place the differential portion 11 in the neutral state so that the transmission of power is electrically interrupted in the power transmission path in the differential portion 11, by placing the first motor M1 in the no-load state.

In the case where the power transmission device is formed by the differential portion 11 and the automatic shift portion 20 as in the embodiment, for example, if the power transmission path in the automatic shift portion 20 is placed in the power-transmission interrupted state due to some malfunction when the vehicle is accelerated, the second motor M2 is placed in a substantially no-load state. Therefore, the second motor M2 may overspeed, and the endurance of the second motor M2 may decrease. An example of the situation where some malfunction occurs is as follows. The linear solenoid valves SL1 to SL5 may not operate according to a shift instruction due to braking of a wire, or a malfunction that occurs in the linear solenoid valves SL1 to SL5. In this case, the clutch C and the brake B, which should be engaged when the vehicle is accelerated, are disengaged.

In the embodiment, a malfunction determination device 86 and a fail-safe control device 88 are provided. The malfunction determination device 86 determines whether a malfunction occurs in the automatic shift portion 20, which constitutes a part of the power transmission device, by making a comparison between the actual value and the theoretical value that relate to the rotational speed of a predetermined rotational member of the shift mechanism 10 (for example, the second motor M2 or the transmitting member 18). The fail-safe control device 88 executes a fail-safe control to prevent the predetermined rotational member from overspeeding, when the malfunction determination device 86 determines that a malfunction occurs in the automatic shift portion 20.

More specifically, a shift position determination device 90 determines whether the shift lever 52 is placed at the running position such as the position "D", the position "M", or the position "R", based on the signal indicating the shift position $P_{SH}$ at which the shift lever 52 is placed. That is, the shift position determination device 90 determines whether the power transmission path in the automatic shift portion 20 is in the power-transmission permitted state.

The malfunction determination device 86 determines that a malfunction occurs in the automatic shift portion 20, when a difference between the actual rotational speed and the theoretical rotational speed of the second motor M2 remains equal to or above a predetermined value for a predetermined period, that is, the automatic shift portion 20 remains in an abnormal state for the predetermined period. The difference between the actual rotational speed and the theoretical rotational speed of the second motor M2 is regarded as a comparison value obtained by making a comparison between the actual value and the theoretical value that relate to the rotational speed of the predetermined rotational member of the shift mechanism 10.

For example, when the shift position determination device 90 determines that the shift lever 52 is placed at the running position, the malfunction determination device 86 calculates the theoretical rotational speed of the second motor M2 (hereinafter, referred to as "theoretical second-motor rotational speed) $N_{M2T}$ based on the speed ratio γ at the gear indicated by the instruction for output for shift provided by the stepped shift control device 82, and the rotational speed $N_{OUT}$ of the output shaft (hereinafter, referred to as "output-shaft rotational speed $N_{OUT}$") detected by an output-shaft rotational speed sensor 72 (refer to FIG. 4), according to the equation, the theoretical second-motor rotational speed $N_{M2T}$=the output-shaft rotational speed $N_{OUT}$×the speed ratio γ at the gear indicated by the instruction for output for shift. Then, the malfunction determination device 86 determines that a malfunction occurs in the automatic shift portion 20, when the difference $\Delta N_{M2}$ (=$N_{M2}$–$N_{MZT}$) between the second-motor rotational speed $N_{M2}$ detected by a M2 rotational speed sensor 74 (refer to FIG. 4) and the theoretical second-motor rotational speed $N_{MZT}$ remains equal to or above the predetermined value for the predetermined period, that is, the automatic shift portion 20 remains in the abnormal state for the predetermined period. Note that, the abnormal state is regarded as a predetermined state based on which it is determined that a malfunction occurs. More specifically, when the automatic shift portion 20 remains in the abnormal state for the predetermined period, it is determined that a malfunction occurs in the automatic shift portion 20. Thus, in the embodiment, "malfunction" and "abnormal state" are clearly distinguished from each other.

The predetermined value is referred to also as "an abnormal state determination value". The predetermined value is empirically determined and set in advance so that when the difference $\Delta N_{M2}$ is equal to or above the predetermined value, it can be determined that the automatic shift portion 20 is in the abnormal state. The predetermined value is set to a certain value, for example, approximately 500 rpm. The predetermined period is referred to also as "malfunction determination period". The predetermined period is set to reduce the possibility that it is erroneously determined that a malfunction occurs although no malfunction occurs, that is, to accurately determine whether a malfunction occurs. The method of setting the predetermined period will be described in detail later.

When the malfunction determination device 86 determines that a malfunction occurs in the automatic shift portion 20 at the time of power-on running, the fail-safe control device 88 executes the fail-safe control to prevent the second motor M2 from overspeeding. For example, the fail-safe control device 88 outputs, to the hybrid control device 84, an instruction to decrease the driving power transmitted by the transmitting member 18 to prevent the second motor M2 from overspeeding, for example, a torque decrease instruction to decrease the torque $T_{IN}$ input to the automatic shift portion 20, by decreasing the torque that is output from the engine 8 and/or the second motor M2 and input to the automatic shift portion 20.

Thus, the predetermined period is a determination period used to determine the timing at which the fail-safe control device 88 starts the fail-safe control. Hereinafter, the predetermined period will be referred to as "fail-safe start determination period $T_F$".

Hereinafter, the method of setting the fail-safe start determination period $T_F$ will be described in detail. As described above, the theoretical second-motor rotational speed $N_{MZT}$ is calculated based on the output-shaft rotational speed $N_{OUT}$ detected by the output-shaft rotational speed sensor 72. The actual second-motor rotational speed $N_{M2}$ is detected by the M2 rotational speed sensor 74. As the output-shaft rotational speed sensor 72, for example, a well-known electromagnetic pickup type rotational speed sensor is employed. As the M2 rotational speed sensor 74, for example, a well-known resolver type rotational speed sensor is employed. When the detected rotational speed of the rotational member is in a low rotational speed region, the accuracy of detecting the rotational speed may deteriorate, or the timing at which the rotational speed is detected may be delayed, due to the characteristic of the rotational speed sensor. That is, for example, in the case where the electromagnetic pickup type rotational speed sensor is used, when the actual rotational speed is in the low rotational speed region, the number of pulse signals in a specific period may vary, or the timing at which the pulse signal is output may be delayed. Thus, the detection accuracy may deteriorate, or the timing at which the rotational speed is detected may be delayed.

When the second-motor rotational speed $N_{M2}$ is in a high rotational speed region, a difference between the second-motor rotational speed $N_{M2}$ and a predetermined overspeed value is small, as compared to when the second-motor rotational speed $N_{M2}$ is in the low rotational speed region. Therefore, when the second-motor rotational speed $N_{M2}$ is in the high rotational speed region, and a malfunction occurs in the automatic shift portion 20, the second motor M2 may overspeed in a short time.

Thus, for example, if the fail-safe start determination period $T_F$ is set to a constant value, the following situations may occur. When the second-motor rotational speed $N_{M2}$ is in the low rotational speed region, it may be erroneously determined that a malfunction occurs, and the fail-safe control may be unnecessarily executed. When the second-motor rotational speed $N_{M2}$ is in the high rotational speed region, the accuracy of determining that a malfunction occurs may decrease, that is, the timing at which it is determined that a malfunction occurs may be delayed, and accordingly, the fail-safe control may not be started before the second motor M2 overspeeds. Thus, it is more strongly desired to improve the accuracy of determining that a malfunction occurs when the second-motor rotational speed $N_{M2}$ is in the high rotational speed region, and to reduce the possibility that it is erroneously determined that a malfunction occurs.

Accordingly, the malfunction determination device 86 includes a period setting device 92 that sets the fail-safe start determination period $T_F$ to a long period when the second-motor rotational speed $N_{M2}$ detected by the M2 rotational speed sensor 74 is low, as compared to when the second-motor rotational speed $N_{M2}$ is high. That is, when the second-motor rotational speed $N_{M2}$ is low, and accordingly, the accuracy, with which the rotational speed sensor detects the second-motor rotational speed $N_{M2}$, deteriorates, and the second motor M2 is unlikely to overspeed, the fail-safe start determination period $T_F$ is set to a long period, to reduce the possibility that it is erroneously determined that a malfunction occurs. When the second-motor rotational speed $N_{M2}$ is high, and accordingly, the second motor M2 is likely to overspeed, the fail-safe start determination period $T_F$ is set to a short period, to quickly determine that a malfunction occurs.

Figure 10:
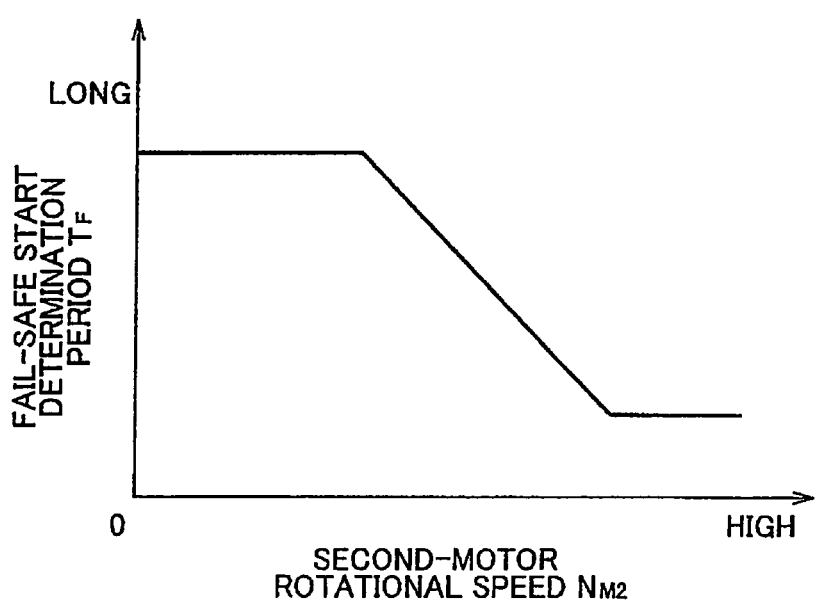
FIG. 10 shows an example of a fail-safe start determination period map used to set a fail-safe start determination period.

For example, the period setting device 92 sets the fail-safe start determination period $T_F$ based on the second-motor rotational speed $N_{M2}$ detected by the M2 rotational speed sensor 74, using a relation (fail-safe start determination period map) as shown in FIG. 10, which is empirically determined and set in advance such that as the second-motor rotational speed $N_{M2}$ decreases, the fail-safe start determination period $T_F$ increases.

Figure 11:
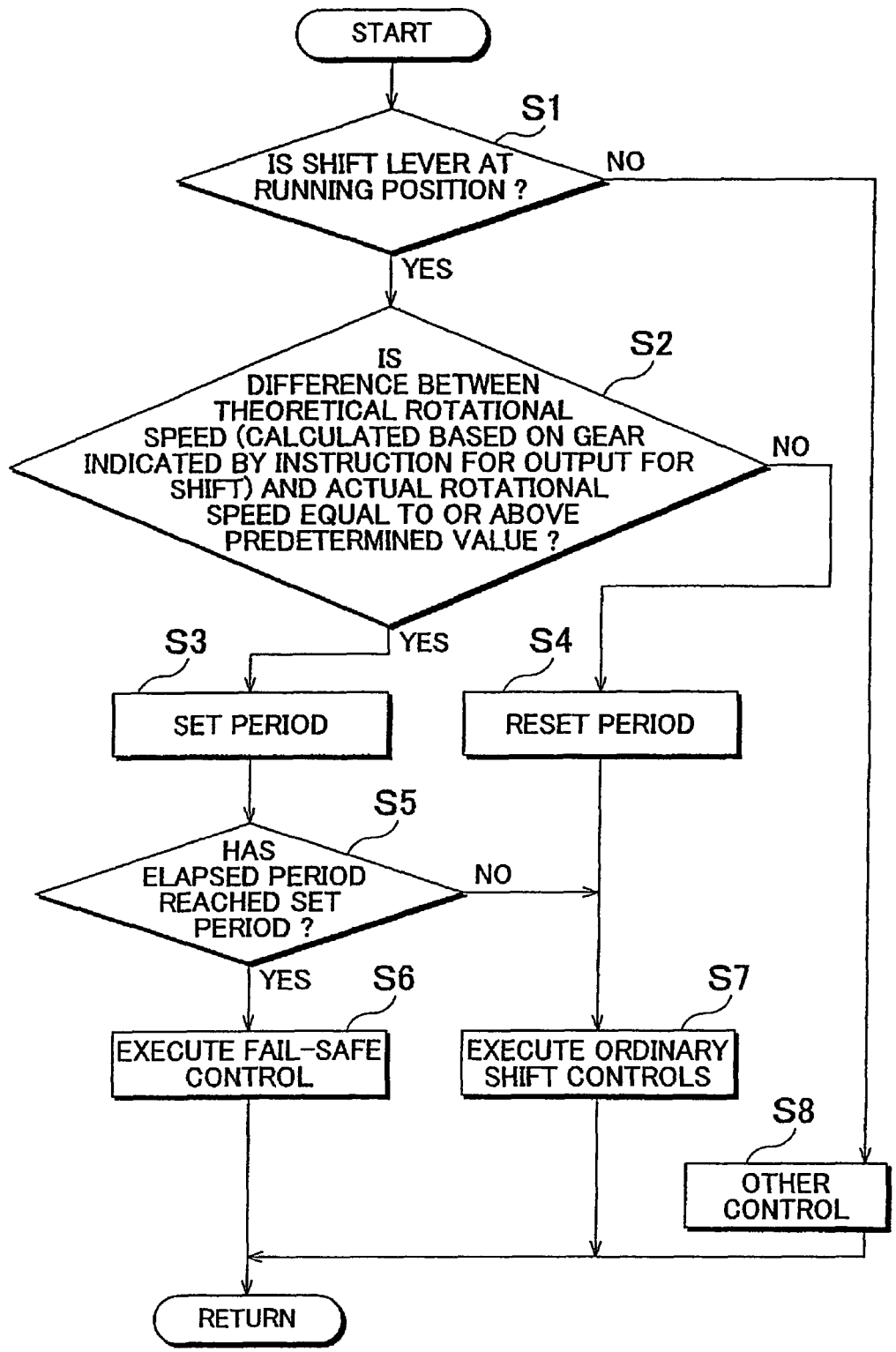
FIG. 11 is a flowchart explaining a control operation performed by the electronic control unit in FIG. 4, that is, a control operation performed to determine that a malfunction occurs in an automatic shift portion at an appropriate timing.

FIG. 11 is a flowchart explaining a main part of a control operation performed by the electronic control unit 80, that is, a control operation that is performed so that it is determined that a malfunction occurs in the automatic shift portion 20 at an appropriate timing. The control operation is performed in an extremely short cycle time of, for example, approximately several msec to several tens of msec, and is repeatedly performed.

In FIG. 11, first in step S1 corresponding to the shift position determination device 90, it is determined whether the shift lever 52 is at the running position such as the position "D" or the position "R", based on the signal indicating the shift position $P_{SH}$ at which the shift lever 52 is placed.

When a negative determination is made in step S1, a control other than a malfunction determination control is executed in step S8. Alternatively, the routine is finished.

When an affirmative determination is made in step S1, it is determined whether the difference (deviation amount) $\Delta N_{M2}$ between the theoretical second-motor rotational speed $N_{MZT}$ and the second-motor rotational speed $N_{M2}$ is equal to or above the predetermined value (abnormal state determination value), that is, whether the automatic shift portion 20 is in the abnormal state, in step S2 corresponding to the malfunction determination device 86. The theoretical second-motor rotational speed $N_{MZT}$ is calculated based on the speed ratio $\gamma$ at the gear indicated by the instruction for output for shift, and the output-shaft rotational speed $N_{OUT}$ detected by the output-shaft rotational speed sensor 72. The second-motor rotational speed $N_{M2}$ is detected by the M2 rotational speed sensor 74. The abnormal state determination value is set to a certain value, for example, approximately 500 rpm. The abnormal state determination value may increase as the output-shaft rotational speed $N_{OUT}$ decreases, or may increase as the second-motor rotational speed $N_{M2}$ decreases, to prevent an erroneous determination when the rotational speed is in the low rotational speed region, and to improve the determination accuracy when the rotational speed is in the high rotational speed region.

When an affirmative determination is made in step S2, the fail-safe start determination period $T_F$ is set using, for example, the fail-safe start determination period map as shown in FIG. 10, in step S3 corresponding to the period setting device 92. The fail-safe start determination period $T_F$ increases as the second-motor rotational speed $N_{M2}$ detected by the M2 rotational speed sensor 74 decreases. Also, in step S3, measurement of an elapsed period is started.

When a negative determination is made in step S2, the routine proceeds to step S4 corresponding to the malfunction determination device 86. In step S4, the fail-safe start determination period $T_F$ remains unset, or the fail-safe start determination period $T_F$ set in step S3 is reset even when the elapsed period has not reached the set fail-safe start determination period.

Subsequently to step S3, in step S5 corresponding to the malfunction determination device 86, it is determined whether the elapsed period has reached the fail-safe start determination period $T_F$ set in step S3. That is, it is determined whether the automatic shift portion 20 remains in the abnormal state for the fail-safe start determination period $T_F$ after it is determined that the automatic shift portion 20 is in the abnormal state in step S2.

When an affirmative determination is made in step S5, the fail-safe control is executed to prevent the second motor M2 from overspeeding, in step S6 corresponding to the fail-safe control device 88. For example, to prevent the second motor M2 from overspeeding, the torque decrease instruction is output to decrease the torque $T_{IN}$ input to the automatic shift portion 20 by decreasing the torque output from the engine 8 and/or the second motor M2.

When a negative determination is made in step S5, or after the process in step S4 is performed, the routine proceeds to step S7 corresponding to the stepped shift control device 82 and the hybrid control device 84. In step S7, the ordinary automatic shift control for the automatic shift portion 20, and the ordinary shift control for the differential portion 11 that functions as the electric CVT are executed.

As described above, in the embodiment, the malfunction determination device 86 determines whether the difference $\Delta N_{M2}$ between the theoretical second-motor rotational speed $N_{MZT}$ and the second-motor rotational speed $N_{M2}$ is equal to or above the abnormal state determination value, that is, whether the automatic shift portion 20 is in the abnormal state. The theoretical second-motor rotational speed $N_{MZT}$ is calculated based on the speed ratio $\gamma$ at the gear indicated by the instruction for output for shift, and the output-shaft rotational speed $N_{OUT}$ detected by the output-shaft rotational speed sensor 72. The second-motor rotational speed $N_{M2}$ is detected by the M2 rotational speed sensor 74. When the automatic shift portion 20 remains in the abnormal state for the fail-safe start determination period $T_F$, the malfunction determination device 86 determines that a malfunction occurs in the automatic shift portion 20. When the second-motor rotational speed $N_{M2}$ is low, the fail-safe start determination period $T_F$ is set to a long period, as compared to when the second-motor rotational speed $N_{M2}$ is high. Thus, it is possible to determine that a malfunction occurs in the automatic shift portion 20 at an appropriate timing. For example, when the second-motor rotational speed $N_{M2}$ detected by the M2 rotational speed sensor 74 is in the low rotational speed region, it is possible to reduce the possibility that it is erroneously determined that a malfunction occurs. Also, when the second-motor rotational speed $N_{M2}$ is in the high rotational speed region, it is possible to quickly determine that a malfunction occurs.

In the embodiment, when the malfunction determination device 86 determines that a malfunction occurs in the automatic shift portion 20, the fail-safe control device 88 executes the fail-safe control to prevent the second motor M2 from overspeeding. Therefore, it is possible to reduce the possibility that the malfunction determination device 86 erroneously determines that a malfunction occurs in the automatic shift portion 20. This reduces the possibility that the fail-safe control is unnecessarily executed. Also, when there is a high possibility that the second motor M2 will overspeed, the fail-safe control is quickly executed.

In the embodiment, the fail-safe control device 88 executes the fail-safe control that decreases the torque output from the engine 8 and/or the second motor M2, that is, the torque $T_{IN}$ input to the automatic shift portion 20, to prevent the second motor M2 from overspeeding. Therefore, when it is determined that a malfunction occurs in the automatic shift portion 20, it is possible to appropriately prevent the second motor M2 from overspending.

Next, other embodiments of the invention will be described. In the following description, the same and corresponding portions as in the above-described embodiment are denoted by the same reference numerals, and the description thereof will be omitted.

Next, a modified example of the above-described embodiment will be described. In the above-described embodiment, the period setting device 92 sets the fail-safe start determination period $T_F$ based on the second-motor rotational speed $N_{M2}$ detected by the M2 rotational speed sensor 74. In the modified example, instead of, or in addition to setting the fail-safe start determination period $T_F$ based on the second-motor rotational speed $N_{M2}$, the period setting device 92 sets the fail-safe start determination period $T_F$ to a long period when a comparison value is small, as compared to when the comparison value is large. The comparison value is obtained by making a comparison between an actual value and a theoretical value that relate to the rotational speed of the predetermined rotational member of the shift mechanism 10, for example, the difference $\Delta N_{M2}$ between the theoretical second-motor rotational speed $N_{MZT}$ and the second-motor rotational speed $N_{M2}$ detected by the M2 rotational speed sensor 74. That is, when the difference $\Delta N_{M2}$ is small, and accordingly, the degree of abnormality is low, the fail-safe start determination period $T_F$ is set to a long period, to reduce the possibility that it is erroneously determined that a malfunction occurs. When the difference $\Delta N_{M2}$ is large, and accordingly, the degree of abnormality is high, the fail-safe start determination period $T_F$ is set to a short period, to quickly determine that a malfunction occurs.

Figure 12:
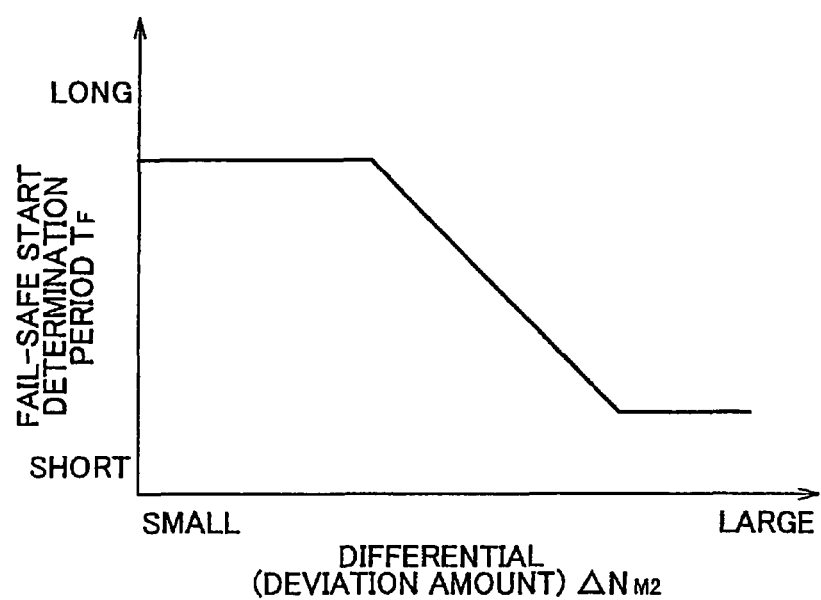
FIG. 12 shows an example of a fail-safe start determination period map used to set the fail-safe start determination period in a modified example of the embodiment, FIG. 12 corresponding to FIG. 10.

For example, the period setting device 92 sets the fail-safe start determination period $T_F$, based on the actual difference $\Delta N_{M2}$, using a relation (fail-safe start determination period map) as shown in FIG. 12, which is empirically determined and set in advance such that as the difference (deviation amount) $\Delta N_{M2}$ decreases, the fail-safe start determination period $T_F$ increases.

As described above, in the modified example, the malfunction determination device 86 determines whether the difference $\Delta N_{M2}$ between the theoretical second-motor rotational speed $N_{MZT}$ and the second-motor rotational speed $N_{M2}$ is equal to or above the abnormal state determination value, that is, whether the automatic shift portion 20 is in the abnormal state. When the automatic shift portion 20 remains in the abnormal state for the fail-safe start determination period $T_F$, the malfunction determination device 86 determines that a malfunction occurs in the automatic shift portion 20. When the difference $\Delta N_{M2}$ is small, the fail-safe start determination period $T_F$ is set to a long period, as compared to when the difference $\Delta N_{M2}$ is large. Therefore, instead of, or in addition to the effects obtained in the above-described embodiment, it is possible to determine that a malfunction occurs in the automatic shift portion 20 at an appropriate timing. For example, when the difference $\Delta N_{M2}$ is small, and accordingly, the degree of abnormality is low, it is possible to reduce the possibility that it is erroneously determined that a malfunction occurs. Also, when the difference $\Delta N_{M2}$ is large, and accordingly, the degree of abnormality is high, it is possible to quickly determine that a malfunction occurs.

The embodiments of the invention have been described in detail with reference to the drawings. However, the invention may be realized by combining the above-described embodiments, or may be realized in other embodiments.

For example, in the above-described embodiments, the period setting device 92 sets the fail-safe start determination period $T_F$ based on the second-motor rotational speed $N_{M2}$ detected by the M2 rotational speed sensor 74, or based on the comparison value, for example, the difference $\Delta N_{M2}$. However, the invention is not limited to these methods of setting the fail-safe start determination period $T_F$. That is, the fail-safe start determination period $T_F$ may be set based on various parameters indicating the operating state. For example, the fail-safe start determination period $T_F$ may be set based on the engine speed $N_E$ and the speed ratio $\gamma 0$ of the differential portion 11, because the second-motor rotational speed $N_{M2}$ can be determined based on the engine speed $N_E$ and the speed ratio $\gamma 0$ of the differential portion 11, according to the relation among the rotational elements of the differential portion 11. Also, the fail-safe start determination period $T_F$ may be set based on the engine speed $N_E$ and the first-motor rotational speed $N_{M1}$.

Also, in the above-described embodiments, the power transmission device is formed by the differential portion 11 and the automatic shift portion 20. However, the invention is not limited to this configuration. The invention may be applied to various power transmission devices. For example, the power transmission device may include a clutch that switches the state of the power transmission path from the output shaft of the transmission to the drive wheels, between the power-transmission permitted state and the power-transmission interrupted state. In this case, when it is determined that a malfunction occurs in the clutch, for example, the fail-safe control is executed to prevent a predetermined rotational member of the transmission from overspeeding. Particularly, in the case where a motor is operatively connected to the output shaft, the fail-safe control is executed to prevent the motor from overspeeding.

Also, in the above-described embodiments, the second motor M2 is used as an example of the predetermined rotational member. However, any rotational member may be used as the predetermined rotational member, as long as the actual rotational speed of the rotational member can be detected, and the theoretical rotational speed of the rotational member can be calculated. However, it is preferable to use, as the predetermined rotational member, the rotational member that needs to be prevented from overspeeding when the fail-safe control is executed based on the determination that a malfunction occurs in the rotational member. Also, because the second motor M2 is operatively connected to the transmitting member 18, the embodiments have been described using the second-motor rotational speed $N_{M2}$. However, the rotational speed of the transmitting member 18 may be used. Further, in the above-described embodiments, the fail-safe control is executed to prevent the second motor M2 from overspeeding. However, when the rotational region where the second motor M2 overspeeds differs from the rotational region where the transmitting member 18 overspeeds, it is preferable that the fail-safe control should be executed for one of the second motor M2 and the transmitting member 18, which overspeeds in a lower rotational speed region.

Also, in the above-described embodiments, in the case where the fail-safe control that prevents the overspeed is executed, the malfunction determination device 86 determines whether a malfunction occurs in the automatic shift portion 20 at the time of power-on running. However, in the case where a control other than the fail-safe control that prevents the overspeed is executed, the malfunction determination device 86 may determine whether a malfunction occurs in the automatic shift portion 20 at a time other than the time of power-on running. For example, it may be determined whether a malfunction occurs in the automatic shift portion 20 at the time of coasting. In this case, when the automatic shift portion 20 is in the abnormal state, the theoretical value is above the actual value. Therefore, it is necessary to determine whether the theoretical value is above the actual value, when the actual value and the theoretical value are compared with each other.

Also, in the above-described embodiments, the comparison value obtained by making a comparison between the actual value and the theoretical value that relate to the predetermined rotational member of the shift mechanism 10 is the difference $\Delta N_{M2}$ ($=N_{M2}-N_{MZT}$) between the second-motor rotational speed $N_{M2}$ detected by the M2 rotational speed sensor 74 and the theoretical second-motor rotational speed $N_{MZT}$. However, the comparison value is not limited to the difference $\Delta N_{M2}$. Various comparison values may be used as long as it can be determined whether a malfunction occurs using the comparison values.

For example, the comparison value may be a rotational speed ratio $R_{M2}$($=N_{M2}/N_{MZT}$) that is the ratio of the second-motor rotational speed $N_{M2}$ to the theoretical second-motor rotational speed $N_{MZT}$. In this case, for example, in step S2 in FIG. 11, it is determined whether the rotational speed ratio $R_{M2}$ is equal to or above an abnormal state determination value that is obtained by adding a predetermined value to 1, unlike the above-described embodiments. In this manner, the abnormal determination device 86 appropriately determines whether the automatic shift portion 20 is in the abnormal state. Also, unlike the above-described embodiments, when the rotational speed ratio $R_{M2}$ is small, that is, when the rotational speed ratio $R_{M2}$ is close to 1, the period setting device 92 may set the fail-safe start determination period $T_F$ to a long period, as compared to when the rotational speed ratio $R_{M2}$ is large, that is, when the rotational speed ratio $R_{M2}$ is far from 1. That is, when the rotational speed ratio $R_{M2}$ is close to 1, and accordingly, the degree of abnormality is low, the fail-safe start determination period $T_F$ is set to a long period, to reduce the possibility that it is erroneously determined that a malfunction occurs. When the rotational speed ratio $R_{M2}$ is far from 1, and accordingly, the degree of abnormality is high, the fail-safe start determination period $T_F$ is set to a short period, to quickly determine that a malfunction occurs. Thus, when the rotational speed ratio $R_{M2}$ is close to 1, and accordingly, the degree of abnormality is low, it is possible to reduce the possibility that it is erroneously determined that a malfunction occurs. When the rotational speed ratio $R_{M2}$ is far from 1, and accordingly, the degree of abnormality is high, it is possible to quickly determine that a malfunction occurs.

Also, for example, the comparison value may be a difference $\Delta\gamma(=\gamma-\gamma_T)$ between an actual speed ratio $\gamma$(=the second-motor rotational speed $N_{M2}$ detected by the M2 rotational speed sensor 74/the output-shaft rotational speed $N_{OUT}$ detected by the output-shaft rotational speed sensor 72) of the automatic shift portion 20, which constitutes at least a part of the power transmission device, and a theoretical speed ratio $\gamma_T$ (the speed ratio at the gear indicated by the instruction for output for shift). In this case, for example, in step S2 in FIG. 11, it is determined whether the difference $\Delta\gamma$ is equal to or above an abnormal state determination value, unlike the above-described embodiments. In this manner, the abnormal determination device 86 appropriately determines whether a malfunction occurs in the automatic shift portion 20. Also, unlike the above-described embodiments, when the difference $\Delta\gamma$ is small, the period setting device 92 may set the fail-safe start determination period $T_F$ to a long period, as compared to when the difference $\Delta\gamma$ is large. That is, when the difference $\Delta\gamma$ is small, and accordingly, the degree of abnormality is low, the fail-safe start determination period $T_F$ is set to a long period, to reduce the possibility that it is erroneously determined that a malfunction occurs. When the difference $\Delta\gamma$ is large, and accordingly, the degree of abnormality is high, the fail-safe start determination period $T_F$ is set to a short period, to quickly determine that a malfunction occurs. Thus, when the difference $\Delta\gamma$ is small, and accordingly, the degree of abnormality is low, it is possible to reduce the possibility that it is erroneously determined that a malfunction occurs. When the difference $\Delta\gamma$ is large, and accordingly, the degree of abnormality is high, it is possible to quickly determine that a malfunction occurs.

In the above-described embodiments, the differential portion 11 (the power split mechanism 16) functions as the electric CVT in which the speed ratio $\gamma0$ is continuously changed from the minimum value $\gamma0\min$ to the maximum value $\gamma0\max$. However, for example, the invention may be applied to a vehicular drive apparatus that includes the differential portion 11 in which the speed ratio $\gamma0$ is changed in a stepwise manner using the differential action, instead of continuously changing the speed ratio $\gamma0$.

In the above-described embodiments, the differential portion 11 may include a differential-action limitation device that is provided in the power split mechanism 16, and that limits the differential action of the differential portion 11 so that the differential portion 11 is operated as a stepped transmission with at least two forward gears.

Also, in the power split mechanism 16 in the above-described embodiments, the first carrier CA1 is connected to the engine 8, the first sun gear S1 is connected to the first motor M1, and the first ring gear R1 is connected to the transmitting member 18. However, the connection relation is not necessarily limited to this. Each of the engine 8, the first motor M1, and the transmitting member 18 may be connected to any of the three elements CA1, S1, and R1 of the first planetary gear unit 24.

In the above-described embodiments, the engine 8 is directly connected to the input shaft 14. However, for example, the engine 8 may be operatively connected to the input shaft 14 via a gear, a belt, or the like. The engine 8 and the input shaft 14 do not necessarily need to be provided on a common axis.

In the above-described embodiments, the first motor M1 and the second motor M2 are disposed coaxially with the input shaft 14, the first motor M1 is connected to the first sun gear S1, and the second motor M2 is connected to the transmitting member 18. However, the first motor M1 and the second motor M2 do not necessarily need to be provided in this manner. For example, the first motor M1 may be operatively connected to the first sun gear S1 via a gear, a belt, a reducer, or the like, and the second motor M2 may be operatively connected to the transmitting member 18 via a gear, a belt, a reducer, or the like.

In the above-described embodiments, each of the hydraulic frictional engagement devices, such as the first clutch C1 and the second clutch C2, may be a magnetic-particle engagement device such as a magnetic-particle clutch, an electromagnetic engagement device such as an electromagnetic clutch, or a mechanical clutch such as a mesh dog clutch. For example, when the electromagnetic clutch is employed, the hydraulic control circuit 70 is not the valve device that switches the oil passage. Instead, the hydraulic control circuit 70 may be a switching device, an electromagnetic switching device, or the like, which switches the state of an electric instruction signal circuit that provides an electric instruction signal to the electromagnetic clutch.

In the above-described embodiments, the automatic shift portion 20 is provided in the power transmission path between the transmitting member 18, which is the output member of the differential portion 11 (i.e., the power split mechanism 16), and the drive wheels 34. However, other types of shift portions (transmissions) may be provided in the power transmission path. For example, a continuously variable transmission (CVT) that is one of automatic transmissions may be provided. Alternatively, an automatic transmission of a constant mesh parallel two-axes type in which a gear is automatically selected using a select cylinder and a shift cylinder may be provided (although a manual transmission of a constant mesh parallel two-axes type is well known). The invention may be also applied to these cases.

In the above-described embodiments, the automatic shift portion 20 is connected to the differential portion 11 in series via the transmitting member 18. However, the input shaft 14 may be provided in parallel with a counter shaft, and the automatic shift portion 20 may be coaxially provided on the counter shaft. In this case, the differential portion 11 is connected to the automatic shift portion 20 so that power can be transmitted, via a transmitting member set which includes a counter gear pair, a sprocket, and a chain, and which functions as the transmitting member 18.

In the above-described embodiments, the power split mechanism 16, which functions as the differential mechanism, may be a differential gear unit that includes a pinion that is rotated by the engine, and a pair of bevel gears that meshes with the pinion. In this case, the differential gear unit is operatively connected to the first motor M1 and the transmitting member 18 (the second motor M2).

In the above-described embodiments, the power split mechanism 16 includes one planetary gear unit. However, the power split mechanism 16 may include at least two planetary gear units. When the power split mechanism 16 is in the non-differential mode (the speed-ratio fixed mode), the power split mechanism 16 may function as a transmission with at least three gears. Each of the at least two planetary gear units is not limited to the single pinion planetary gear unit, and may be a double pinion planetary gear unit.

In the above-described embodiments, the shift operation device 50 includes the shift lever 52 that is operated to select the shift position $P_{SH}$ among the plurality of positions. Instead of the shift lever 52, other devices may be provided. For example, a switch that can select the shift position $P_{SH}$ among the plurality of positions, such as a push-button switch or a slide switch, a device that can switch the shift position $P_{SH}$ among the plurality of positions in response to the voice of the driver, instead of manual operation, or a device that can switch the shift position $P_{SH}$ among the plurality of positions according to foot operation, may be provided. Also, in the above-described embodiment, by moving the shift lever 52 to the position "M", the shift ranges are set. However, the highest gear in each shift range may be set as the gear. In this case, the gear is selected, and the automatic shift portion 20 shifts to the selected gear. For example, when the shift lever 52 is manually moved to an upshift position "+" or a downshift position "−" in the position "M", one of the first gear to the fourth gear is selected in the automatic shift portion 20 according to the movement of the shift lever 52.

While the invention has been described with reference to example embodiments thereof, it is to be understood that the invention is not limited to the example embodiments or constructions. To the contrary, the invention is intended to cover various modifications and equivalent arrangements. In addition, while the various elements of the example embodiments are shown in various combinations and configurations, which are exemplary, other combinations and configurations, including more, less or only a single element, are also within the spirit and scope of the invention.

What is claimed is:

1. A control apparatus for a vehicular drive apparatus that includes a driving power source, and a power transmission device that transmits power from the driving power source to a drive wheel, the control apparatus comprising
   a malfunction determination device that determines that the power transmission device is in an abnormal state when a comparison value is equal to or above a predetermined value, and determines that a malfunction occurs in the power transmission device when the power transmission device continuously remains in the abnormal state for a predetermined period,
   wherein: the comparison value is obtained by making a comparison between an actual value and a theoretical value that relate to a rotational speed of a predetermined rotational member that constitutes at least a part of the vehicular drive apparatus; and
   the malfunction determination device sets the predetermined period according to an operating state of the power transmission device, wherein the predetermined period is set using a map that shows a relationship between the predetermined period and the operating state of the power transmission device, and
   when an actual rotational speed of the predetermined rotational member is low, the malfunction determination device sets the predetermined period to a long period, as compared to when the actual rotational speed is high.

2. The control apparatus according to claim 1, wherein the comparison value is a difference between an actual rotational speed and a theoretical rotational speed of the predetermined rotational member.

3. The control apparatus according to claim 2, wherein the theoretical rotational speed is calculated based on a value relating to an output rotational speed of at least a part of the power transmission device, and a speed ratio of the at least the part of the power transmission device.

4. The control apparatus according to claim 1, wherein the comparison value is a ratio of an actual rotational speed of the predetermined rotational member to a theoretical rotational speed of the predetermined rotational member.

5. The control apparatus according to claim 4, wherein the theoretical rotational speed is calculated based on a value relating to an output rotational speed of at least a part of the power transmission device, and a speed ratio of the at least the part of the power transmission device.

6. The control apparatus according to claim 1, wherein the comparison value is a difference between an actual speed ratio and a theoretical speed ratio of at least a part of the power transmission device.

7. The control apparatus according to claim 1, further comprising
   a fail-safe control device that executes a fail-safe control to prevent the predetermined rotational member from overspeeding, when the malfunction determination device determines that a malfunction occurs in the power transmission device.

8. The control apparatus according to claim 7, wherein the fail-safe control device prevents the predetermined rotational member from overspeeding by reducing the driving power transmitted by the predetermined rotational member.

9. The control apparatus according to claim 1, wherein the power transmission device includes a differential portion, and a shift portion;
   the differential portion includes a differential mechanism that includes a first element connected to an engine, a second element connected to a first motor, and a third element connected to a transmitting member and a second motor, and the differential mechanism distributes output from the engine to the first motor and the transmitting member;
   the shift portion is provided in a power transmission path from the transmitting member to the drive wheel, and functions as an automatic transmission; and
   the malfunction determination device determines whether a malfunction occurs in the shift portion.

10. The control apparatus according to claim 9, further comprising
    a fail-safe control device that executes a fail-safe control to prevent at least one of the transmitting member and the second motor from overspeeding, when the malfunction determination device determines that a malfunction occurs in the shift portion.

11. The control apparatus according to claim 10, wherein the fail-safe control device executes the fail-safe control that reduces power that is output from at least one of the engine and the second motor, and that is input to the shift portion.

12. The control apparatus according to claim 10, wherein the differential portion is operated as a continuously variable transmission by controlling an operating state of the first motor.

13. The control apparatus according to claim 9, wherein the differential portion is operated as a continuously variable transmission by controlling an operating state of the first motor.

14. A control method for a vehicular drive apparatus that includes a driving power source, and a power transmission device that transmits power from the driving power source to a drive wheel, the control method comprising
determining that the power transmission device is in an abnormal state when a comparison value is equal to or above a predetermined value, and determining that a malfunction occurs in the power transmission device when the power transmission device continuously remains in the abnormal state for a predetermined period,
wherein: the comparison value is obtained by making a comparison between an actual value and a theoretical value that relate to a rotational speed of a predetermined rotational member that constitutes at least a part of the vehicular drive apparatus; the predetermined period is set according to an operating state of the power transmission device, wherein the predetermined period is set using a map that shows a relationship between the predetermined period and the operating state of the power transmission device, and
when an actual rotational speed of the predetermined rotational member is low, the predetermined period is set to a long period, as compared to when the actual rotational speed is high.

15. The control method according to claim 14, wherein the comparison value is a difference between an actual rotational speed and a theoretical rotational speed of the predetermined rotational member.

16. The control method according to claim 14, wherein the comparison value is a ratio of an actual rotational speed of the predetermined rotational member to a theoretical rotational speed of the predetermined rotational member.

17. The control method according to claim 14, wherein the comparison value is a difference between an actual speed ratio and a theoretical speed ratio of at least a part of the power transmission device.

18. The control method according to claim 14, further comprising
executing a fail-safe control to prevent the predetermined rotational member from overspeeding, when it is determined that a malfunction occurs in the power transmission device.

19. A control apparatus for a vehicular drive apparatus that includes a driving power source, and a power transmission device that transmits power from the driving power source to a drive wheel, the control apparatus comprising:
a malfunction determination device that determines that the power transmission device is in an abnormal state when a comparison value is equal to or above a predetermined value, and determines that a malfunction occurs in the power transmission device when the power transmission device continuously remains in the abnormal state for a predetermined period,
wherein: the comparison value is obtained by making a comparison between an actual value and a theoretical value that relate to a rotational speed of a predetermined rotational member that constitutes at least a part of the vehicular drive apparatus;
the malfunction determination device sets the predetermined period according to an actual rotational speed of the predetermined rotational member of the power transmission device, wherein the predetermined period is set using a map that shows a relationship between the predetermined period and the actual rotational speed of the predetermined rotational member, and
when an actual rotational speed of the predetermined rotational member is low, the malfunction determination device sets the predetermined period to a long period, as compared to when the actual rotational speed is high.

20. The control apparatus according to claim 1, wherein
when the comparison value is small, the malfunction determination device sets the predetermined period to a long period, as compared to when the comparison value is large.

21. The control method according to claim 14, wherein
when the comparison value is small, the malfunction determination device sets the predetermined period to a long period, as compared to when the comparison value is large.

22. The control apparatus according to claim 19, wherein
when the comparison value is small, the malfunction determination device sets the predetermined period to a long period, as compared to when the comparison value is large.

* * * * *